(12) United States Patent
Beckett

(10) Patent No.: US 10,698,684 B2
(45) Date of Patent: Jun. 30, 2020

(54) CODE INJECTION AND CODE INTERCEPTION IN AN OPERATING SYSTEM WITH MULTIPLE SUBSYSTEM ENVIRONMENTS

(71) Applicant: Pegasystems Inc., Cambridge, MA (US)

(72) Inventor: Stephen M. Beckett, Woodstock, GA (US)

(73) Assignee: PEGASYSYTEMS INC., Cambridge, MA (US)

( * ) Notice: Subject to any disclaimer, the term of this patent is extended or adjusted under 35 U.S.C. 154(b) by 0 days.

(21) Appl. No.: 15/620,314

(22) Filed: Jun. 12, 2017

(65) Prior Publication Data
US 2017/0329621 A1    Nov. 16, 2017

Related U.S. Application Data

(63) Continuation of application No. 13/369,283, filed on Feb. 8, 2012, now Pat. No. 9,678,747.

(60) Provisional application No. 61/441,340, filed on Feb. 10, 2011, provisional application No. 61/440,688, filed on Feb. 8, 2011.

(51) Int. Cl.
*G06F 8/76*    (2018.01)
*G06F 8/53*    (2018.01)
*G06F 8/41*    (2018.01)
*G06F 9/455*    (2018.01)
*G06F 9/54*    (2006.01)

(52) U.S. Cl.
CPC ............... *G06F 8/76* (2013.01); *G06F 8/443* (2013.01); *G06F 8/447* (2013.01); *G06F 8/53* (2013.01); *G06F 9/45516* (2013.01); *G06F 9/45533* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 5,937,192 A | 8/1999 | Martin | |
| 6,158,049 A | 12/2000 | Goodwin et al. | |
| 6,263,363 B1 | 7/2001 | Rosenblatt et al. | |
| 6,675,374 B2 * | 1/2004 | Pieper | G06F 8/4442 712/235 |
| 6,823,460 B1 | 11/2004 | Hollander et al. | |
| 6,968,540 B2 | 11/2005 | Beck et al. | |

(Continued)

*Primary Examiner* — Wynuel S Aquino
*Assistant Examiner* — Mark A Gooray
(74) *Attorney, Agent, or Firm* — Smith, Gambrell & Russell, LLP

(57) ABSTRACT

Systems, methods, and apparatuses are provided for code injection and code interception in an operating systems having multiple subsystem environments. Code injection into a target process can rely on generation of a virtual process that can permit analysis of information loaded in a memory image of the target process regardless of the host environment in which the target process is executed. Based at least on information collected via the analysis, code can be injected into the target process while preserving integrity of the target process. Code interception also can exploit the analysis for suitable hooking that preserves integrity of target process. Code interception can utilize relocatable tokenized code that can be parameterized through token replacement.

14 Claims, 5 Drawing Sheets

(56) References Cited

U.S. PATENT DOCUMENTS

| | | |
|---|---|---|
| 6,988,262 B1 | 1/2006 | Mallory et al. |
| 7,472,383 B2 | 12/2008 | Long et al. |
| 7,506,329 B1 | 3/2009 | Boucher |
| 7,716,643 B2 | 5/2010 | Goldin |
| 7,856,547 B1 | 12/2010 | Koryakin et al. |
| 8,656,380 B1 * | 2/2014 | sgeirsson ............... G06F 8/443 717/158 |
| 2005/0172282 A1 | 8/2005 | Shenfield et al. |
| 2006/0277539 A1 | 12/2006 | Amarasinghe et al. |
| 2006/0282827 A1 | 12/2006 | Yeap et al. |
| 2007/0283319 A1 | 12/2007 | Coy et al. |
| 2008/0066055 A1 | 3/2008 | Shebs |
| 2008/0092128 A1 | 4/2008 | Corry et al. |
| 2008/0134175 A1 | 6/2008 | Fitzgerald et al. |
| 2009/0049421 A1 * | 2/2009 | Meijer ................. G06F 9/4484 717/100 |
| 2009/0300020 A1 | 12/2009 | Chen et al. |
| 2010/0042981 A1 | 2/2010 | Dreyer et al. |
| 2010/0070870 A1 | 3/2010 | Halperin et al. |
| 2010/0088496 A1 | 4/2010 | Zolnowsky et al. |
| 2010/0287219 A1 | 11/2010 | Caso et al. |
| 2010/0333065 A1 | 12/2010 | Sverdlov et al. |
| 2010/0333079 A1 | 12/2010 | Sverdlov et al. |
| 2011/0107313 A1 | 5/2011 | Baron |
| 2012/0005269 A1 | 1/2012 | Janssen et al. |
| 2012/0096071 A1 | 4/2012 | Murphey et al. |
| 2012/0167057 A1 * | 6/2012 | Schmich ............ G06F 11/3644 717/130 |
| 2012/0226742 A1 | 9/2012 | Momochilov et al. |

* cited by examiner o Virtual Process Loader (e.g., loader component 110) ⟵ 200
        Software Module Loader
            Sources
                o    From Disk or other persistent storage
                o    From local Memory
                o    From a Target Process's Memory
            Features
                o    API that offers OS compatible functionality
                o    Simultaneous loading of modules that target incompatible platforms, e.g. x64 and x32
                o    Simultaneous loading modules utilizing different executable file formats
                o    Only copies memory from target process as it is queried locally
                o    Address translation between native addresses in target process memory and local storage.
            Memory Map
                Creates memory map of each base allocation of target process
                Used with target process module object to discover modules loaded into target process
                o    Works if process uninitialized and module lists are not created
                o    Works is module is "hidden", been removed from module lists
            Key data structure discovery and or simulation
                Process data structures from target process' memory copied
                Data pointed to copied and cached
                When process uninitialized, key data structures created via memory map and discovery/analysis o Disassembler with programmatic analysis (e.g., disassembler component 120)
            Works with Local memory
            Works with modules loaded from storage
            Works with Virtual Process to handle target process memory seamlessly
            Find Call functionality to find private function addresses using parameter tracking to an arbitrary level
            Support of multiple platforms o Relocatable tokenized code buffers (e.g., injection code 134)
        Loader can load and manage DLL of relocatable/tokenized code buffers regardless of executable file format or target platform
            Tokens can be intelligently replaced with data utilizing disassemble

FIG. 2

CODE INJECTION AND CODE INTERCEPTION IN AN OPERATING SYSTEM WITH MULTIPLE SUBSYSTEM ENVIRONMENTS

CROSS-REFERENCE TO RELATED APPLICATIONS

This application is a continuation of U.S. patent application Ser. No. 13/369,283, filed Feb. 8, 2012, now U.S. Pat. No. 9,678,747, which claims the benefit of priority to U.S. Provisional Patent Application No. 61/440,688, filed on Feb. 8, 2011, and U.S. Provisional Patent Application No. 61/441,340, filed on Feb. 10, 2011, all of which are incorporated herein by reference in their entireties.

SUMMARY

The disclosure generally relates, in certain aspects, to injection of a software runtime engine into a compatible target application, also referred to as a target process. One or more embodiments can permit code injection or code interception in an operating system (OS) that can support multiple subsystem environments (e.g., prior or legacy types of operating systems with respect to the OS, such as). Such OS can comprise Windows operating system, Unix, Linux, Symbian, Android, Chromium, and substantially any operating system for wireless computing devices or tethered computing devices. Some embodiments can create a virtual process related to the target process, analyze the virtual process, and inject code or permit code interception in the target process based on an outcome of the analysis.

In one aspect, an application programming interface (API) to a module associated with a process (e.g., a target process or a virtual process) and already loaded into memory can be created. In certain embodiments, creation of the API can comprise scanning memory and reverse engineering from memory image to specification in order to create at least one data structure that can describe the module. The specification can establish the manner in which an executable file according to a specific executable file format can be loaded into memory.

In another aspect, a virtual module can be provided. In certain implementations, creation of the virtual module can be enabled by creating an API to a module in a remote process (e.g., a target process) that can be in such a state that key data structure(s), such as Process Environment Block (PEB) in a Windows operating system, may not be available.

In yet another aspect, a virtual process can be created. To at least such end, an API to a remote process (e.g., a target process) that can include all, substantially all, or other non-empty subsets of currently loaded modules and key data structures of the remote process can be created. The virtual process can comprise memory map caching with address translation, and can permit extraction, or otherwise generation, of key data structures and module information from memory. The virtual process can provide substantially the same functionality that a local process can provide. Accordingly, in certain implementations, a disassembler component, also referred to as disassembler, can operate on the virtual process in at least a conventional manner.

In one or more embodiments, tokenized relocatable code buffer(s) can be provided. Such buffer(s) can leverage one or more features of the virtual process to permit code injection and/or code interception. In one aspect, at least one disassembly function call (e.g., FindCall) can be provided to permit, at least in part, code injection and code interception by utilizing a tokenized relocatable code buffer.

In certain embodiments, a tokenized relocatable code buffer and a disassembly function call can be implemented independently from implementation (e.g., creation) of the virtual process. The tokenized relocatable code buffer and the disassembly function call described herein can increase efficiency in administration or manipulation of a local process unrelated to the virtual process. In an aspect, combination of a virtual process with at least one tokenized code buffer and at least one disassembly function call can permit code injection and/or code interception (also referred to as hooking) that can be superior to conventional implementations of code injection and hooking.

The disclosure can provide an injection engine (e.g., embodied in example system 100, shown in FIG. 1, or example system 300, shown in FIG. 3) that can utilize all or at least a portion of the above to analyze a target process, determine a target platform thereof, and thus determine a injection technique to use; analyze modules or code to find function address(es) and find requisite data for the injection technique, load tokenized relocatable injection code, replace tokens with results of analysis, copy injection code buffer to the target process, introduce a hook in a memory location in order to assure execution of injection code buffer, where the memory location can be determined from the injection technique and analysis of the target process utilizing loader, disassembler, and finding internal function calls.

In one exemplary implementation, the injection engine described herein can enable, at least in part, a x64 process to inject code into a WoW64 process without utilization of a proxy process. In certain scenarios, the injection engine can enable a WoW64 .Net based integrator to inject into a x64 process without utilization of a proxy process. It should be appreciated that in addition to code injection, one or more embodiments of the disclosure can avoid utilization of conventional techniques for code injection and thus can avoid restrictions associated with various shortcomings of such conventional techniques—e.g., utilization of remote threads, utilization of Windows Keyboard Hooks, or patching memory addresses without analysis to assure validity, or compatibility, and that no collision with other hooks can occur. In additional or alternative scenarios, one or more embodiments of the disclosure can provide code injection that can assure that the injected code is loaded after the core OS DLL(s) (such as NTDLL and KERNEL32 in Windows) and before all other modules associated with the target process.

Other advantages of the disclosure will be set forth in part in the description which follows, and in part will be apparent from the description, or may be learned by practice of the disclosure. The advantages of the disclosure can be realized and attained by means of the elements and combinations particularly pointed out in the appended claims. It is to be understood that both the foregoing general description and the following detailed description are exemplary and explanatory only and are not restrictive of the subject disclosure, as claimed.

BRIEF DESCRIPTION OF THE DRAWINGS

The accompanying drawings are incorporated in and illustrate example embodiment(s) of the disclosure and, together with the description and claims, serve to explain various principles, features, or aspects of the disclosure.

FIG. 2 illustrates an exemplary schematic representation of various functionalities of an injection engine embodied by the exemplary system in FIG. 1.

DETAILED DESCRIPTION

Figure 1:
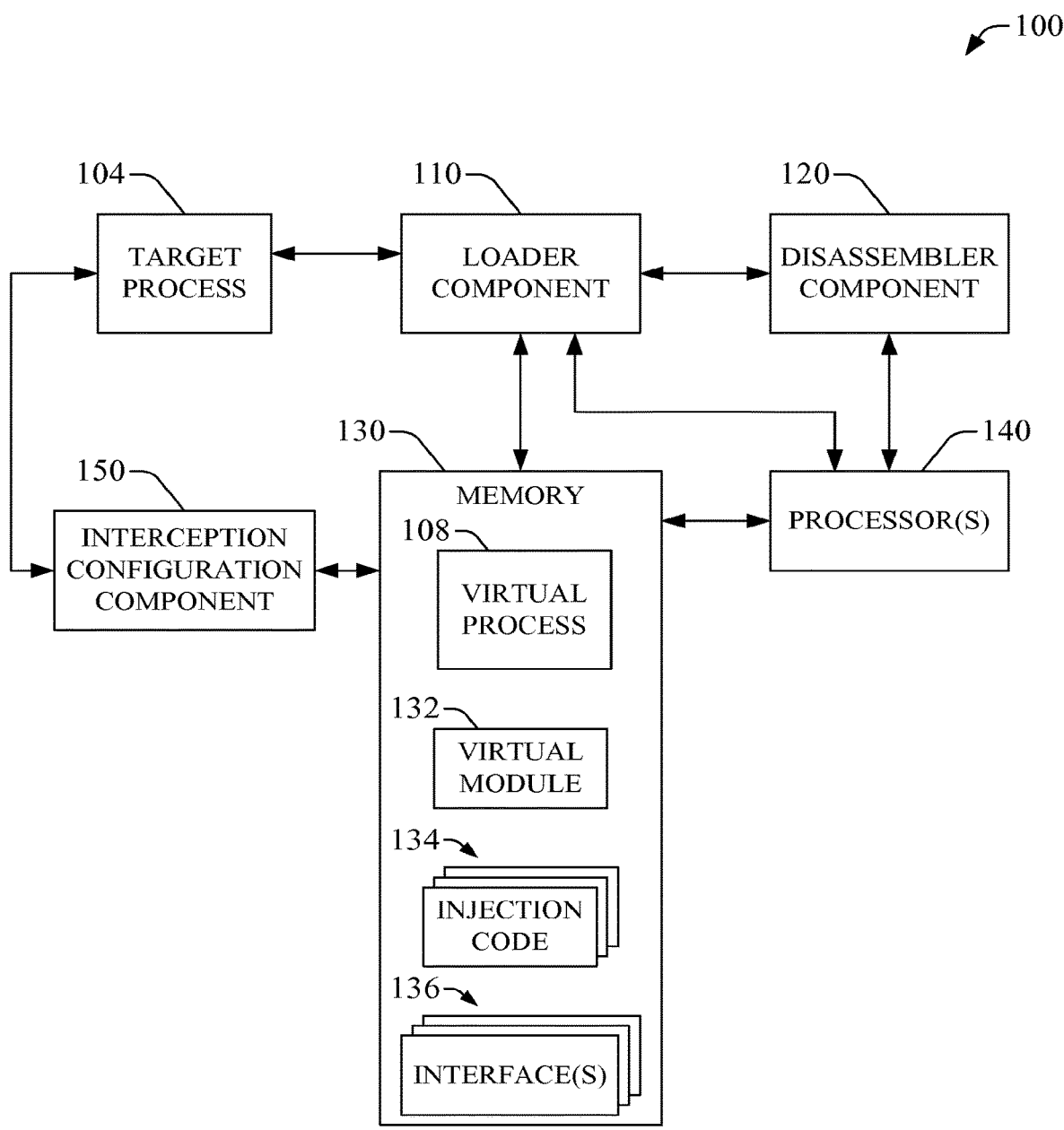
FIG. 1 illustrates an exemplary system for code injection and code interception in accordance with aspects described herein.

The subject disclosure may be understood more readily by reference to the following detailed description of example embodiments of the subject disclosure and to the Figures and their previous and following description.

Before the present compounds, compositions, articles, devices, and/or methods are disclosed and described, it is to be understood that the subject disclosure is not limited to specific code injection systems and methods, or code interception system and methods, or systems and method to manipulated relocatable code (e.g., relocatable computer-executable instructions). It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

As employed in this specification, annexed drawings, and appendices the terms "unit," "component," "system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing examples and related illustrations are but a few examples and are not intended to limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "platform" can be utilized interchangeably.

Throughout the description and claims of this specification, the words "comprise," "include," and "have" and variations of such words, such as "comprising" and "comprises," "including" and "includes," "having" and "has," mean "including but not limited to," and are not intended to exclude, for example, other systems, subsystems, components, action, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiment(s), aspects, and features of the subject disclosure, example(s) of which are illustrated in the accompanying drawings. Wherever possible, the same reference numbers are used throughout the drawings to refer to the same or like parts.

Software is generally available in various forms, such as device drivers, Desktop Applications, Server based Services, Embedded in hardware devices, and the like. In addition, software is typically stored as binary data in an executable file format.

An operating system generally supports one or more executable file formats for the various software program types it needs. As the operating system can target particular hardware platforms, the executable file format thus can contain code (e.g., computer-executable code instructions) and data compatible with the target hardware platform.

It is not uncommon for an executable file format to support a variety of different hardware platforms, or even different Operating Systems. The operating system can load and parse the executable file to determine compatibility and execute the necessary steps to execute the software. If the file is incompatible but the operating system is unable to determine that, the software execution can fail.

For example, Microsoft Windows supports the Portable Executable (PE) format for its native applications. The Microsoft PE can contain device drivers, executables, dynamic link libraries (DLLs), as well as other file types. The PE can also contain code and data that targets a variety of platforms, such as hardware (IA-32, IA-64, and x86-64, etc.) to software (Native Windows, .Net, etc.).

An Operating System may also support multiple executable file formats, such as Windows support for DOS MZ executables. Moreover, an operating system may also support executable files that target different platforms, such as Windows support for 32-bit and 64-bit programs. However, despite supporting different executable formats and/or supporting different target platforms, once a process is created using an initial executable file image, it is limited to loading additional executable file images to only those that are compatible with the hosting process. For example, once the operating system loads a 64-bit executable, it cannot subsequently load a 32-bit DLL or DOS program as an executable image within the 64-bit process' address space. Once an OS has loaded an executable file, it typically offers a rich API that allows for programmatic interaction to the executing image, such as querying function addresses.

Operating systems are not the only loaders of executable files. Disassemblers/Decompilers open executable files in order to examine the code/data the files contain. Emulators open executable files and execute them on target platforms other than what the executable file natively targets. Virtualization tools open and execute them in an environment that simulates the target operating system.

An operating system also can support one or more debuggers and have one or more application programming interfaces (APIs) that can permit a debugger application to attach to a process and receive an event of a process action and send a command to the process. Examples of such a command include setting breakpoints on instructions that are part of the process. Such interaction among a debugger and the process a highly intrusive. In addition or in the alternative, an operating system typically can provide one or more APIs to services and libraries.

Processes have different address spaces. Generally, an OS parses PE and creates shell and populates with prerequisites (e.g., data in specific data structures). Uses PE to lay out memory, code, and load additional libraries. Microsoft Windows operating system provides many functions that provide access to the properties of the PE. Get access to the various contained PEs, or modules, and their functions or resources.

Several operating systems can support the execution of files that were originally written for a different operating system. For example, the Windows x64 operating system can support the execution of the following types of files: (a) .bat/.cmd; (b) Windows 32 bit; (c) Windows 64 bit; (d) OS/2 1.x; (e) POSIX; (f) MS-DOS .exe; (g) .com, or (h) .pif, among others. Certain operating systems can support new security techniques to make it difficult for code viruses and malware code to inject. One of such techniques is Address Space Layout Randomization (ASLR). In certain OS implementations the randomization is determined once, at boot time. But in others it is determined for each process execution—and this is certainly a foreseeable enhancement for all Operating Systems. In addition, security products, anti-cheat engines, copy protection engines, and several other types of packages, also install hooks into the operating systems' kernel to modify the loading of an application. In certain scenarios, installation of hooks can be directed to protect a software image or it could be directed to simply add functionality to an application. An example of this is Host Intrusion Protection by security vendors or OS hosting products.

To implement code injection, conventional systems generally utilize built-in operating system mechanisms, (e.g., utilizing remote hooks supplied in Windows operating system, and typically identified as "Windows hooks" or loading a DLL using a registry entry). In addition or in the alternative, conventional systems can implement code injection by creating a thread in the remote process into which code is to be injected. Such approaches utilized by conventional system can have significant limitations comprising: (i) requiring a process to be fully initialized, therefore not being able to have a desired software engine injected prior to the loading of any modules and/or creation of any operating system or application objects; and (ii) altering application (or process) initialization order which can cause some target applications to become unstable.

In general, a 32-bit DLL cannot be used in a 64-bit program for several reasons. For example, loading a 32-bit DLL from a 64-bit process and executing code of the 32-bit DLL is not fundamentally feasible due to the design of 64-bit systems. On possible pathway to circumvent such limitation can be to load and initialize WoW64 and related kernel structures; namely, a 64-bit process is to be configured as 32-bit process "on the fly." Another possible pathway can be to create a surrogate process and work with such process through component object model (COM) technology. It should be appreciated, notwithstanding, that it can be quite simple to load resources from a 32-bit DLL into a 64-bit process. For instance, such resources can be loaded by specifying the flag LOAD_LIBRARY_AS_DATAFILE when calling LoadLibraryEx.

Some of the drawbacks of conventional code injection and DLL injection in particular, yet not exclusively, can create security or data integrity issues in addition to causing, in certain scenarios, an OS to operate in manners that can be incompatible with common, widely-adopted usage.

Another technique employed for code injection in conventional systems includes patching a known memory address during process initialization. Such technique commonly fails, for example, when ASLR changes a previously known address or a memory address has another patch in place.

Regardless of the technique that is employed, when a target application (or target process) belongs to a system or subsystem not compatible with the injecting system or injecting subsystem, such as an x64 process attempting to inject code into a x32 process on Windows OS, a proxy process typically is required. The proxy process can run as the target subsystem to provide architecture compatibility— the target subsystem being the subsystem into which code injection is intended or desired. Generally, execution of the proxy process is required by the x64 injector (or injection engine), which cannot load x32 code to inject into the x32 process. In the alternative, in conventional systems, when the x64 bit code can load 32-bit code, such code typically is loaded in the form of static data. It should be appreciated, notwithstanding, that in scenarios in which the OS (e.g., Windows operating system) is allowed to inject a DLL utilizing a registry entry, a proxy process typically is not required. Yet, injection via a registry entry typically has the limitation of being undeterministic, as in such injection scenario the OS performs the injection of the DLL as part of loading the USER32.dll library. Accordingly, injection of code in such scenarios, e.g., via a proxy process or a registry entry, can be unsafe, causing, for example, data integrity to be compromised.

As described in greater detail below, the subject disclosure generally relates, in one aspect, to injection of a software runtime engine into a compatible target application. One or more embodiments of the subject disclosure enable code injection or code interception in an operating system (OS) that can support multiple subsystem environments (e.g., prior or legacy operating systems). In one embodiment, an method for loading a software module into the memory of an interrogating process is provided. When executed by a processor, the interrogating process can be referred to as interrogator or, in certain embodiments, an interrogator engine. In another embodiment, an exemplary system that embodies an injection engine. In one aspect the injection engine can comprise or embody the interrogator engine. In the subject specification and annexed drawings, code injection also is referred to as injection where the disclosure context ensures clarity. In another aspect, with operating systems supporting different types of executables, such as Windows x64 which runs native 64-bit Windows applications and also is configured to execute 32-bit applications, the subject disclosure identifies and addresses the need to support relocatable tokenized code buffers that originate from an executable file (such as a dynamic link library (DLL)) that may not be compatible with the host application. For instance, the Windows operating system does not load a 32-bit DLL in a x64 application.

FIG. 1 illustrates a block diagram of an exemplary system 100 for injecting code and intercepting code in accordance with aspects of the disclosure. Such aspects are described in connection with the various functional elements of exemplary system 100. The exemplary system 100 is an exemplary embodiment of an injection engine or injector as described herein. It should be appreciated that processor(s) 140 can execute the target process 104 and process(es) resulting from code injection into such target process. In addition, processor(s) 140 can comprise a plurality of two or more distributed processors, wherein a first processor can execute a local process (not shown) and a second processor, remote with respect to the first processor can execute the target process 104, which is thus a remote process. In another aspect, processor(s) 140 can execute at least one of interface(s) 136 (e.g., API(s)) which can be embodied in a group of one or more non-empty sets of computer-executable instructions (e.g., programming code instructions or code, such as injection code 134). In certain embodiments, loader component 140 and disassembler component 120 can be embodied in groups of computer-executable instructions, and processor(s) 140 can execute such groups of computer-executable instructions in order to achieve the at least part of the functionality related to code injection and code interception in accordance with aspects described herein. In addition, in certain embodiments, referred to as firmware or embedded embodiments, loader component 110 and/or disassembler component 120 can be integrated into processor(s) 140. Processor(s) 140 can communicate (e.g., exchange data, and instructions or commands) with memory 130 and the loader component 110 and disassembler component 120, via a bus architecture (represented in FIG. 1 with arrows connecting such functional elements; see also bus 313 illustrated in FIG. 3). Memory 130 can comprise a memory image of the virtual process 108. While not illustrated, target process 104 is embodied in a memory image, which can be part of memory 130. In the alternative the memory image associated with target process can be a memory different from memory 130. As illustrated, a processor of processor(s) 140 can be functionally coupled to target process 104 via loader component 110. In such scenario, that target process 104 can be a remote process. In the alternative (not shown), in a scenario in which the target process 104 is a local process, a processor of processor(s) 140 can be directly coupled to the target process 104.

In one aspect, the loader component 110 can support a set of one or more executable file formats and thus can load a module regardless of target subsystem (e.g., a Linux operating system executing in a 64-bit processor architecture). For example, the loader component can load x64 and x32 modules. In the subject disclosure, a software module can be stored in an executable file format on memory, storage media or, generally, any computer-readable storage media. Unlike an operating system which can load a software module for execution, the loader component 110 can load the module for analysis. In certain scenarios, the loader component 110 can load a module for analysis similarly to the manner in which a disassembler can load a module. Yet, in contrast to a disassembler, the loader component 110 can provide an API that can support interacting with a module. In certain implementations, such API can be similar, yet not necessarily identical, to the API provided by a target operating environment in which a target process is executed.

Additionally, the loader can load a plurality of modules into the interrogator address space, even in scenarios in which two or more modules of the plurality of modules target different and incompatible platforms. The latter functionality of the loader component 110 generally is unavailable or disallowed by operating systems. In one aspect, the loader component 110 can load an executable file format via a common interface and a class that implements the details of the target format (or executable file format of the target process), thus permitting one or more executable formats to be supported.

Utilizing the loader component 110, an interrogator engine can have the same or similar functionality in dealing with a loaded module as does a process that has loaded a module into a memory space thereof. In certain embodiments, the loader may not be configured to execute code in the loaded module(s) if it targets an incompatible platform, such as a different processor.

In an another aspect, the loader can load a module that has been loaded into the address space of a different process. While loading a module from its stored form can generally be a rather straightforward process of following a documented specification, reading from the memory of a disparate process that may target a different platform can require, in certain embodiments, the loader to read data from the disparate process' memory locations, and manage address translations between local storage buffer(s) and the source address of the different process, e.g., a remote target process. Additionally, this may require address translation between the interrogator (e.g., an executed interrogating process) and the target process, as well as reverse engineering a memory map of the target process to determine the manner in which the memory map was constructed and backwardly determining the constituent software modules of the target process.

It should be appreciated that when an operating system constructs the memory image of a process by reading the main module, such as files with the .EXE extension, the OS can set up additional data structures that help the operating system manage the process. An example is the Process Environment Block (PEB).

In certain embodiments, the loader component 110 can copy a target process's data structure(s) and can create a full memory map of the target process. Additionally, APIs that match the OS can be provided which allow the interrogator to access information about the process that is identical to what the target process can query about itself.

The disassembler component 120 (also referred to as disassembler 120) can process machine code for any processor chipset or processor architecture. For instance, the disassembler component 120 can process x32 machine code and x64 machine code. In one aspect, the disassembler 120 can implement a programmatic runtime and can be compatible with an active loaded module and/or a module loaded via loader component 110 regardless of the source from which such modules are loaded, e.g., disk file or from memory image of target process.

In one aspect, exemplary system 110 can provide an API to query module characteristics, such as properties of a module; architecture associated with a process that has loaded the module; addresses of functions or other named exports such as data, and the memory contained at such addresses; and the like. similar to native OS support. In one aspect, loader component 110 and/or disassembler component can exploit the API to implement various functionality such as loading a module from a disk image and/or a memory image of the target process 104, or any other process that is intended for analysis as described herein.

The various functional elements of exemplary system 100 permit such exemplary injection engine to work against a process that has either been created suspended (which is a feature of certain operating systems such as windows) or is currently paused while a process creation event is being processed (a feature of the OS).

An exemplary schematic representation of various aspects or features of the injection engine embodied by exemplary system 100 is shown in diagram 200 in FIG. 2.

As described herein, the target process (e.g., target process 104) can be analyzed prior to the target process completing initialization, and injection can be handled intelligently. For example, type of the process can be determined, e.g., via the API provided by the exemplary system 100. Based at least on such type, in one aspect, injection approach can be determined. In another aspect, based at least on type of the target process, compatible code can be loaded and copied into a memory image of the target process because our injecting engine can load a module that is compatible with target process. For example, x64 code can load x32 module, a feature that is unavailable for conventional loaders available to an OS. In yet another aspect, Injection location can be analyzed for validity, probing, for example, likelihood of hook collision (e.g., presence or absence of a hook at a current memory address). In another aspect, injection code can be patched (or injected) precisely prior to process loading any modules or spawning any threads. In certain implementations code injection can be implemented via techniques to push data and/or code to a memory address. In another aspect, a module loaded by the loader component 110, such as virtual module 132, can appear as part of the OS memory image of the target process 104. Loader component 110 can analyze the module loads of other librarie(s) that can be loaded as part of executing the target process 104, thus preventing or mitigating the possibility of missing analysis of component relevant to operation (e.g., execution) of the target process.

In another aspect, when a target subsystem (e.g., Win16) is different from injecting subsystem (e.g., Win32), a run-time analysis implemented by the loader component 110 can permit discovery of additional memory locations to patch in (or inject) target subsystem compatible code to carry out a subsystem compatible injection without the need for a proxy process and preserving all the benefits previously described such as intelligent validation of patch address and early injection.

In one aspect, the type of the target process type can be determined by accessing a header in a memory image for the target process and comparing the information available in the header with a specification for the executable file format associated with the executable file.

It should be appreciated that a target process can be a remote process. In certain embodiments (e.g., exemplary embodiment 300 illustrated in FIG. 3) the remote process can be a process executed in a remote computing device (a desktop personal computer, a mobile personal computer, a mobile telephone, etc.; see remote computing devices 314a, b,c) in communication or otherwise functionally coupled with a computing device that implements (e.g., executes) code injection in accordance with aspects of the subject disclosure.

In an aspect, as code injection generally is desired to be performed at the earliest possible moment, a target process may not be fully initialized at point of analysis (e.g., an instant prior to performing code injection). On Windows operating system, a process can be started in a suspended state and before substantive initialization (e.g., loading of modules specific to the. This is a desirable (e.g. ideal or nearly ideal) point at which to inject. Also on Windows operating system, if using Process Creation events from the kernel, the event is received at a point that is nearly identical to the suspended point, and before any significant initialization. This is also a desirable (e.g., ideal or nearly ideal) point to inject.

These points are desirable (e.g., ideal or nearly ideal) because, for a Windows OS, for example, only the main module (.EXE), the operating system's main kernel interface library, NTDLL.DLL, and most of Windows' base API, Kernel32.dll, have been loaded into the memory address space of the target process, without loading any additional modules. In an aspect, the subject disclosure intends to inject, or load, code as early as possible, injecting code at this point is thus desired. Injection at this point can place injected code prior to, for example, the Microsoft SHIM engine, which may modify the process or any third party DLLs which may begin initializing the process.

However, at this point, the process is not completely initialized. One example is the PEB's Ldr field is NULL. The Ldr points to the PEB_LDR_DATA data structure which contains linked lists of the current loaded modules. Knowledge of the locations of such modules can permit the loader component to load such modules. In one aspect, based at least on of such knowledge, the loader component 110 can determine if a target process is valid, and exit the process gracefully in case the target process is not compatible with code to be injected into the target process. Utilizing the previously identified memory map, the loader can attempt to load a module at each base address. If it is a module in the target process, it can complete successfully, and using the aforementioned APIs, the module's name, and other key properties can be determined. In this manner, in OS(s) that exploit PEB, the loader can construct the PEB_LDR_DATA and the list of loaded modules by inspection, therefore completing a remote view of an existing, suspended, and unitialized process.

In one aspect, when the interrogator queries the loader, or loader component, about the remote process (e.g., target process 104 in embodiments in which it executes in a first processor remote to a second processor), the interrogator can receive two forms of memory address. One is the native address (or native memory address) in the target process, which is embodied in the remote process. Thus, when the interrogator queries for the address of a specific function in a specific module in the remote process, it gets its valid address in that remote process. This can be important because conventional implementations typically have relied on knowing the address ahead of time, which can make injection fragile. Moreover, with address space layout randomization, there is no guarantee that the location of a module or function in one process can be the same in another, even though that has been the case with Windows operating system(s). In scenarios in which is desirable to query the actual code or data resource from the remote process, the loader can read that memory form the target process, but the loader can store it in a local location at a local address that can, likely, be different than at the remote process. This translation of addressing can be handled automatically by the Loader and code, data, resources, or the like, from the target process can be queried by either the native address with transparent translation, or the local address.

In addition, exemplary system 100 can permit efficient operation in other scenarios related to hooking. For instance, the subject disclosure allows efficient operation (e.g., code execution, and code injection or code interception when a hook is in place on an public export which breaks analysis related to various disassembly function calls (e.g., FindCall) described herein, where such analysis becomes broken because at least one of the disassembly function calls (e.g., FindCall) has a "jmp" opcode at the star memory address of the at least one the disassembly function call into a target process and related code. The subject disclosure can troubleshoot such scenario because the subject disclosure employs the memory analysis to find the base address of a module, detects a hook is in place, and it can then load from disk a copy of the module, which can be clean (e.g., without hooks); the subject disclosure applies the at least one disassembly function call (e.g., FindCall) on such clean module to find an inner call, get the relative virtual address (RVA) of the inner call, and then calculate the actual address in the target process by RVA plus the determined HMODULE.

As described herein, an interrogation engine or interrogator in accordance with aspects of the disclosure can comprise a disassembler (e.g., disassembler component 120), that can operate on different target platforms or different subsystems within an OS. Working with the loader, or loader component, the disassembler can disassemble the target process for programmatic analysis. If the loader (e.g., loader component 110) is analyzing code or data which contain addresses in the target process, the loader can automatically translate the addresses and return the correct code or data from the target process. In this manner, the disassembler (e.g., disassembler component 120) is rarely or never aware of whether the disassembler is analyzing its current process or a remote process. Such feature provides significant analytical power to the interrogator when dealing with remote processes.

Using the above tools (or functional elements) or components, the interrogator can analyze a target process (e.g., target process 104) with the same or substantially the same power that it can bring to bear on itself. Before seeking a location to place the injection code (e.g., a portion of injection code 134), the interrogator can use the virtual process (e.g., virtual process 108) to analyze what type of process the target process is. Such analysis can determine (e.g., as an outcome) where (in memory or a memory image) to hook into the target process, and what code to hook into the target process to carry out injection. Such a determination can eliminate the need for proxy processes, which are commonly exploited by conventional systems—where an incompatible process would be forced to start a process (e.g., the proxy process) that is compatible with the target process to carry out actions against the target process and perform complex inter process communication with the proxy process. In the subject disclosure, a native Windows x64 process can analyze a Windows x32 WOW64 (Windows on Windows x64) process and follow the WOW64 injection path and find all or a portion of the appropriate hook locations by analyzing the 32-bit code despite being a native x64 image.

The injection engine, or injection system (e.g., example system 100), comprising the loader component (e.g., 110) and the disassembler component (e.g., 120), can be able to find a correct address of code in the target process where a hook can be placed to load injection code. As hooks are common is software design, e.g., almost all security products use them, it is important for a new hook to avoid colliding with an existing hook. Security products often have kernel based components that intercept process creation and place their hooks there, or scan for other hooks, such as hook(s) that can be implemented in accordance with the subject disclosure. Accordingly, in an aspect, the injection engine does not hook at common locations such as public exports, but instead can use an additional functional element or feature of the subject disclosure to find an internal call that is still a suitable hooking location for injection. Such functional element or feature is embodied in at least one disassembly function call, e.g., the FindCall.

The at least one disassembly function call (e.g., FindCall) and related features, comprises a queryable function, such as a public export with a known parameter list, and can find an internal function call that has a known parameter list. Accordingly, the at least one disassembly function call can find a function call within another function call. Often, in certain embodiments, parameters that are passed into a first function call are forwarded onto a second function call, and the disassembler's programmatic find call (e.g., FindCall) functionality can track the lifetime of parameter use and analyze calls until it finds one that uses the initial parameters in a known manner. This process of tracking the lifetime of a parameter and related use can be nested to an arbitrary level. In this manner, a function address that is not currently hooked or likely to be hooked by another party can be found to assure successful injection. It should be appreciated that if a function call is known (e.g., from documentation) to be, for example, foo(a, b, c), then the positions of operands a, b, and c can be on the stack can be known, and thus the manner in which code can reference such operands also can be known. Likewise, if it is known that a call inside foo is internalCall(b, c, 0), then a call where the b and the c operands are used as the first and second parameter can be searched for, and by tracking the movement of these variables through code, a matching signature can be found, finding the internalCall that is being searched out a plurality of internal calls (or inner calls). In one aspect, the disassembler component 120 can perform tracking of a specific documented signature and/or operands thereof. Upon or after a hook location is found, the disassembler, or disassembler component, can further analyze the location to assure the hook code can be successfully copied over the target location. The code copied over can be saved and subsequently restored.

The interrogator, using the loader (e.g., loader component 110), can analyze the target process and can generate knowledge (or information) related to the target process's platform and where and how to hook it with injection code in order to complete the desired injection. Code that gets copied into the remote process generally needs to be relocatable, and can, in general, need to be modified with addresses and other parameters based on the interrogator's analysis. It also can be possible that the target process targets an incompatible platform. The interrogator can use the loader to load a module compatible with the target process into its address space. For example, a native x64 process could load a x32 DLL that has the injection code for WOW64 processes. The loader allows this even though the Windows OS loader can fail to load incompatible images into a process' address space. The injection code can have tokens built in therein that can be searched for and replaced with the results of the analysis, such as function address(es) or operand(s). In one implementation, utilizing the disassembler and loader in combination, the interrogator can load the injection module for the target process, find and copy an injection function for the target process, and replace known tokens in the injection function based at least on the results of analysis, such that the injection code is fully compatible with both the target process' platform and a location in memory the injection code can be copied to.

In certain implementations, the interrogator can copy these parameterized code buffers (or tokenized code buffer with specific instances of parameter values) into the target process' memory address space and can permit the target process to resume loading. Thus, without the target process (e.g., target process 104) executing code beyond the initial initialization of the target process, the interrogator can inject code into the process in a vastly improved manner with respect to conventional technologies.

In one aspect, one or more embodiments of an injection engine (e.g., exemplary system 100) can permit to copy compatible target code to a target process, and utilize results of analysis to change flagged parameters of injected code to correct values.

In another aspect, tokens can replace operands that refer to function address and data address, both absolute and relative, as well as immediate data values. In one embodiment of an injection engine, e.g., exemplary system 100, interception configuration component 150 can implement (e.g., execute) token replacement. In addition or in the alternative, a processor of the processor(s) 140 can execute a group of computer-accessible instructions (e.g., computer-executable and computer-readable instructions) and, in response, the processor can perform token replacement as described herein. In certain implementations, the group of computer-accessible instructions, when retained in memory, can embody the interception configuration component 150. In addition or alternative embodiments, the disassembler component 120 can implement token replacement as described herein.

In one embodiment, replacing a token can comprise allocating space in a target process for both the code buffer size (padded for alignment), and any data that is desired to be included with the code. In addition, replacing the token can comprise calculating data values using the allocated base address. Moreover, replacing the token can comprise utilizing a tokenizing API to replace values. It should be appreciated that the tokenizing API can use instruction objects for intelligent replacement thereby overcoming limitations of conventional technologies that exploit unintelligent search and replace methods that can lead to incorrect replacements.

Virtual Process Loading

A process can be created by an operating system by parsing a file in an executable file format. The file may indicate additional modules need to be loaded containing additional code or data. The first file, however, is typically considered the "main" or "executable" which defines how the program shall be commenced, such as transferring control to an entry point. Additionally, when a process is created by the OS, the OS can initialize additional data structures in order to manage the process. In certain implementations, a data structure that can be initialized is the process environment block (PEB).

Generally the operating system that creates a process (e.g., a target process) can provide functionality to query memory and, in response, access or retrieve a memory address. In one aspect, loader component 110 can query memory pages of the memory image of the process and identify a base memory address of allocated memory pages and create a memory map of allocated memory pages. In addition for an allocated memory page, the loader component 110 can access information (e.g., data or code, or a combination thereof) in a memory page and analyze content of the memory page. For instance, the loader component 110 can analyze module type of a module loaded in the memory page. In certain implementations, the first page in a memory image of a process at runtime can comprise information on loaded modules, and memory addresses thereof, associated with the process. After a memory address is accessed or retrieved, the memory address can be retained (e.g., read and stored) in local memory.

As an illustration, the Windows OS provides functions to retrieve the address of the PEB, as illustrated in the following code:

```
ULONG64 GetProcessPebAddress(HANDLE hProcess)
{
    ULONG64 result = NULL;
    if( IsWow64Targeting64(hProcess) == TRUE )
    {
        // We are Wow64 on x64 OS
        PROCESS_BASIC_INFORMATION64 pbi;
        memset( &pbi, 0, sizeof(PROCESS_BASIC_INFORMATION64) );
        NTSTATUS status;
        status = _NtWow64QueryInformationProcess64(
            hProcess,
            ProcessBasicInformation,
            &pbi,
            sizeof(PROCESS_BASIC_INFORMATION64),
            NULL );
        if( NT_SUCCESS(status) )
        {
            result = pbi.PebBaseAddress;
        }
        else
            TraceStatus( TraceSource::Service, __FUNCTION__,
    L"_NtWow64QueryInformationProcess64", status );
    }
    else
    {
        PROCESS_BASIC_INFORMATION pbi;
        memset( &pbi, 0, sizeof(PROCESS_BASIC_INFORMATION) );
        NTSTATUS status;
        status = _NtQueryInformationProcess(
            hProcess,
            ProcessBasicInformation,
            &pbi,
            sizeof(PROCESS_BASIC_INFORMATION),
            NULL );
        if( NT_SUCCESS(status) )
        {
            result = (ULONG64)pbi.PebBaseAddress;
        }
        else
            TraceStatus( TraceSource::Service, __FUNCTION__,
    L"_NtQueryInformationProcess", status );
    }
    return result;
}
```

After the PEB address is found, the PEB address can be read into local memory. If the target process is suspended, the Ldr field of the PEB is NULL, and therefore the address of modules is unknown. Because the virtual module can determine if a target address is a valid PE, the answer here is to inspect the entire memory space of the target process and test each base allocation to ascertain if the base allocation is a module. A module handle (HMODULE) indicates the base address of a module in the process. If a module is found, the name of the module can be readily available from the virtual module, and an entry in the Ldr linked lists can be added for such module. If the Ldr field is valid, then the lists of modules can be copied into local memory (e.g., memory 130).

A portion or all modules in a target process can be read by the virtual module such that the virtual process can contain a virtual module for every PE in the target process, including the main. Along with the PEB and any other requisite key data structures (such as thread environment block (TEB)), the virtual process can contain a complete snapshot of a process, either local or remote. In the case of a remote process, the virtual process can permit significant analysis of the remote process without implementation of a thread executing in the remote process. When a process is suspended, it is not be possible to have a thread in the target process. In addition, creating a remote thread for a suspended process can change the initialization of the process, which is a significant shortcoming of certain this technique of conventional technologies.

As described herein the virtual process (e.g., virtual process 108 then provides a rich API similar to what the OS offers for a process which allows other tools, like a disassemble, to seamlessly interact with it.

Virtual Module Loading

The specification of an executable file format can control the manner in which a executable file in the executable file format can be loaded into memory, including the processing of data associated with the executable file, such as querying an address of a function by name.

In an example embodiment, Portable Executable's (PE) files can define executables, dynamic link libraries, and drivers. The Windows operating system works at both the kernel and user mode to parse the file and create the memory image. The Windows SDK then offers the ability to query attributes and data from the loaded module.

The virtual loader can load a PE into a private data space, but provides a rich API to query the same attributes and data from the module that the Windows SDK provides. Functions can even be executed if the host process matches the execution platform of the PE. If it does not, such as 64-bit loading a 32-bit PE, then the code is not executable, but the PE can still be loaded and analyzed.

Typically software is loaded from storage into memory following the executable file format. A novel element of the subject disclosure is the ability to load the Virtual Module into its private memory following an executable file format by analyzing the memory of a process that the operating system has previously loaded a module into. In this manner, the code works backwards from the memory image, and using the inverse of the specification, determines what the original executable file contained in order to build its private memory image.

This may require, in certain scenarios, that translation not only from file offsets to memory addresses, but also address translation from process memory managed by the operating system to the private memory of the Virtual Module.

In an example embodiment of the subject disclosure, a Windows Module from either the local or remote process may be read into a virtual module object. In the case where memory is being scanned and modules are being searched for, a memory address can be passed to the virtual module and the software can determine whether the address represents a module. This is achievable because the specification indicates that key fields of various data headers can contain signatures.

As an illustration, in the IMAGE_DOS_HEADER, the e_magic field can contain 0x5A4D or "MZ", and the IMAGE_NT_HEADERS Signature field will contain 0x00004550, or "PE"00. These are sufficient enough comparisons to determine if a memory address contains a PE. From the PE File Format diagram, in one aspect, it can be observed that such structures are laid out back to back at the front of a PE in memory.

Upon or after a PE has been identified, the specification can be applied to the target memory address space in order to identify and copy any remaining headers. In all or most cases, in the specification, information related to memory locations can be treated referring to memory addresses instead of file offsets since it is being read from memory. It should be appreciated that the specification of an executable file format has both a "file" mode and "memory" mode, and an operating system can reads from file mode and loads into memory. In the disclosure, in certain implementations, the loader component 110 or any virtual loader disclosed herein read from "memory" mode because a memory image associated with a target process has been loaded into by a conventional loader of the OS.

The PE can contain code and data sections identified in tables. Memory blocks identified by these sections can be read or, for minimizing memory use, the memory block can be left unread until it becomes necessary (e.g., in response to a predetermined event). Accordingly, in one aspect, utilizing virtual process address translation (VPAT), when a memory location is queried in a target process (e.g., a remote process), a virtual module which is based on the PE specification can have a look-up table that can be checked (e.g., by the loader component 110 or the disassembler component 120) to determine if the section that contains the code or data has been copied into a memory space associated with the target process. In response to the code and/or data being copied into such memory space, the address of the memory location can be translated (e.g., by the loader component 110 or the disassembler component 120) into a local location, if not it can be read then translated.

Virtual Process Address Translation

Virtual process address translation can be implemented in various manners, which can include generic translation and specific translation. The latter applying translation customized to a specific OS.

Generic Translation.—

Provided a remote memory address, the loader component 110 can determine if the remote memory address is part of an address map associated with a memory image of a remote process, which can be one embodiment of a target process. In the negative case, the loader component 110 can allocate local memory and can copy remote memory into the allocated local memory. In addition, the loader component 110 can store a local memory address associated with the allocated local memory in the address map with the remote memory address as key. In the alternative, in case the remote memory address is part of the address map, the load component 110 can retrieve from the map a local memory address associated with the remote memory address and can return the local memory address. While illustrated with a remote memory address associated with a remote process, the described generic translation also can be applied to a local process embodying the target process.

Windows PE Specific.—

Provided a remote memory address, the loader component 110 can ascertain a remote module that contains the remote memory address, wherein the remote memory address value is greater than or equal to HMODULE and less than or equal to (HMODULE+module size). In one aspect, a virtual process (e.g., virtual process 108) or a component that implements (e.g., executes) the virtual process, can iterate through a module list maintained by or otherwise available to the virtual process and probe each virtual module in the module list to determine if the remote memory address is contained in a probed virtual module. A HANDLE of the probed virtual module can be returned from the virtual module as a HMODULE, where the HMODULE is a base address of the virtual module in the remote process. The remote memory address can be converted to a relative virtual address (RVA) by subtracting the HMODULE from the remote memory address. The loader component 110 can convert the remote memory address to an RVA. In another aspect, the virtual process or a component that implements (e.g., executes) the virtual process can find or identify an enclosing remote section header. In one implementation, the virtual process or the component that implements the virtual process can iterate through sections of the PE associated with the virtual process to determine a location in memory where RVA is greater than or equal to a section virtual address and less than the section virtual address plus section size. In another aspect, the virtual process or a component that implements the virtual process can obtain the address of start of remote section (or remote section address), wherein such address equals HMODULE plus remote section RVA. In one implementation, the virtual process can determine if the remote section address is part of an address map associated with a remote process, which can be an embodiment of a target process. In the negative case, memory in a local process for remote section is allocated, the size of the allocated local memory being determined by remote section size as established by remote section header. In addition or in the alternative, local section can be added to the address map with the remote section address as key. In the affirmative case, when the remote section address is part of the address map, the memory address of the local section can be returned. In one aspect, the virtual process or a component that implements (e.g., executes) the translation described herein can determine a local memory address associated with the remote memory address. For example, address RVA equals address minus HMODULE; offset in section equals RVA minus containing section header RVA; and local memory address equals local section address plus offset in the remote section. The address is returned.

Disassembler and FindCall

The disassembler thus analyzes the code buffer and ends up with a list of instruction objects which understand the opcodes and operands, as well as the length of the code buffer by detecting when the function returns or otherwise ends.

As an example, FindCall works by using static analysis to know that a particular internal function call as a signature that reuses parameters passed into outer function. This is a very common scenario where an undocumented/internal operating system call uses one or more of the parameters passed to a public export that calls the internal call. In one aspect, by creating a mask of the internal function call that identifies the parameter position on the internal call, all or a portion of calls that the outer function makes can be searched, and desired internal function can be found, as the assembly code can set up the right call frame and signature. Parameters can be moved to storage (e.g., mass storage device 304 illustrated in FIG. 3) (such as the stack or scratch area (x64)) before setting up the call to the desired destination. Accordingly, implementation of FindCall tracks oper- and movement for those parameters that are part of the outer function's call. Thus, a parameter may come in on RCX, be moved to the stack, and then moved to R9, and the mask would indicate that the fourth parameter of the target function can actually be the first parameter passed to the outer function, and if it finds the fourth parameter equating the first parameter, that would be considered a match. In case the entire target function mask is a match, the FindCall has found the desired target function for an undocumented and/or unexported function for which it would be difficult otherwise to know an address or offset thereof other than by simply providing such address or offset to the software from static analysis. It should be readily appreciated that such feature of conventional technologies render can render conventional solutions weak, as it would require have a table of all target address possibilities for all versions of the containing software. Therefore, FindCall as described herein provides a substantive improvement over conventional solutions.

In certain scenarios, the dissambler (e.g., disassembler component 120) described herein can implement the assembly call function FindCall in accordance with the following acts:

Provided an address of a function with a documented signature—parameters are passed on stack or registers depending on call convention, and a known call signature of desired function call to find with wildcards supported for positions of documented call signatures that are not known,
Initialize a stack—including parameters;
Start at code area 0
START CODE AREA
Get address of first instruction in code area
START OF DISSEMBLY
Disassemble instruction
If instruction is a MOV
If this is first section, and if source operand is one of one or more parameter(s) in a created virtual process, parameter is changed to destination operand. Note: This is because parameters can be saved off for use later.
If instruction is PUSH
Push source operand onto the stack
If instruction is POP
Pop operand off the stack
If instruction is MOV
If target operand is any part of RCX, any part of RDX, any part of R8 or any part of R9, then source operand is saved into corresponding stack location for fastcall
If target operand is a memory location on the stack, source operand is saved into corresponding stack location for fastcall
If instruction is CALL
If layout of stack is same as documented signature, then the destination operand of call is returned as the desired function address to find. Note: Here, comparison is defined by known call signature of desired function to find.
Address=address+size of instruction
Is address>code area end?
YES: iterate to next code area and jump to start, if at end of code areas return data indicative of failure
NO: jump to start of dissembly
In the foregoing exemplary method, other signatures, such as method signature, can be utilized.

In general, it can be beneficial to be able to load an executable image that contains relocatable code into memory and be able to modify intelligently the relocatable code regardless of the loading platform or the loaded image platform. A virtual loader (e.g., loader component 110) can permit such intelligent modification because executable files are loaded into the virtual loader data structures (e.g., virtual module 132) and not the memory space of a target process or an OS executing the target process. An intelligent API still provides all the requisite access to the contents of the module. The virtual disassembler, also referred to as disassembler or disassembler component (e.g., component 120), can then operate on the target module and code thereof.

The Virtual Disassembler (e.g., disassembler component 120) can analyze code buffers provided by the Virtual Module and/or Virtual Loader in substantially the same a conventional disassembler can point at actual code inside host process. It should be appreciated, however, that a conventional disassembler typically operates in a file or it can be part of a debugger, which is a much more invasive interaction with a target process, takes over a target process, and provides a window into the target process and controls its execution. The virtual disassembler, individually or in combination with a virtual loader (e.g., loader component 110) can permit non-invasive analysis by creating and probing a virtual process (e.g., virtual process 108). Yet, outcome of the analysis described herein can provide information as if the analysis was conducted inside the target process.

It relies on the Virtual Module to provide the details on the target environment. When the Virtual Module points to a module in the host process, it reports the properties of the host process. When the virtual Module loads a module from disk or points to a module in a remote process, it reports the properties of those targets, and the disassembler functions even if the analyzed platform is different from the host process.

Additionally, the virtual disassembler (e.g., disassembler component 120) can permit intelligent replacing of tokenized parameters. Therefore, source code can be written, a token can be included, executable image of the source code having the token can be built, and the token can be replaced with a value at runtime in a manner that is substantially more adequate (e.g., safer) than a straightforward (e.g., without intelligence) search and replace. All while acting on modules that target any environment the virtual disassembler can operate on, rather than just the host process environment (e.g., the environment in which the target process 104 executes on).

For example, if an immediate location of a particular data width is tokenized, the loader component 110 can be utilized to get the address of a function by name, use the disassembler component 120 to determine the function's length, copy the code into a buffer by knowing its starting address and length, and then replace the token with a new value only if the token occupies an immediate operand of the same data width therefore avoiding any matches that may be operators or part of some other addressing scheme.

```
static BOOL ReplaceImmediateToken( PVOID pBuffer, DWORD
codeLength, TokenType token, TokenType newValue )
{
    _ASSERT(pBuffer!=NULL);
    if( pBuffer == NULL )
        return FALSE;
    BOOL result = FALSE;
    OpenSpan::CInstruction ci;
    for( DWORD_PTR pCode = (DWORD_PTR)pBuffer;
        pCode<((DWORD_PTR)pBuffer + codeLength);
        pCode = (DWORD_PTR)ci.NextInstruction( ) )
    {
        if( pCode == NULL )
            break;
        if( ci.Initialize( NULL, (PVOID)pCode, NULL, TRUE ) ==
TRUE )
```

```
        {
            if( ci.ImmediateSize( ) == sizeof(TokenType) )
            {
                if( (TokenType)ci.ImmediateValue( ) == token )
                {
                    PVOID pImmediate = ci.pImmediate( );
                    *((TokenType *)pImmediate) = newValue;
                    result = TRUE;
                }
            }
        }
        else
            return FALSE;
    }
    return result;
}
```

It can be readily appreciated that that any part of an instruction could be similar replaced, such as Relative Offsets etc.

In one aspect, the virtual disassembler (e.g., disassembler component 120) can support tokenized parameter replacement of instruction elements. Moreover, the virtual disassembler, can handle code that is active in memory or passive in file, where passive in file allows for any supported target which can enable injection across platforms.

In the disclosure, an executable image is a file that contains code, data, and other software resources that an operating system can load into an existing program, or execute to initiate execution of a new program. The executable image depends, at least in part, on particular format (e.g., Executable and Linkable Format (ELF), Portable Executable and Common Object File Format (PECOFF)) of the executable file. The file is typically created by a development environment. For example, C/C++ code can be compiled into .obj files by a compiler and subsequently combined together by a linker component, or linker, to produce a single executable file. The linker can produce a file using the executable file format of a chosen platform. For example, the Microsoft® Visual Studio® development platform can produce files using the Portable Executable format when targeting the Windows operating system.

An executable file format typically can contain one or more headers that can indicate the type of executable the executable file contains, the environment it targets, how its code and data is organized, and information to indicate if it has other dependencies, such as external libraries.

As an example, the Windows operating system has software that can load executable files. In one aspect, for an operating system, loading executable files can comprise parsing the headers to set up a memory space, loading and or setting up the various data structures that help manage the image, and then loading the various code and data sections. If the executable file references other executable files it depends on, such as DLLs, then the executable file can load them. The process continues until all required files have been loaded. If the executable file describes a program, such as an .EXE, then the process can launch the program by having a thread execute its entry point. Executable images may also be loaded for analysis by various functional elements such as by analysis tools and disassemblers (e.g., diassembler component 120).

As described herein, in one embodiment (e.g., exemplary system 100), a loader (e.g., loader component 110) is provided, wherein the loader can support loading of executable files for analysis. In one aspect, the loader can load a virtual module (e.g., virtual module 132) when the source is the remote memory image of an executable file already loaded by the operating system. Regardless of source, the injection engine described herein (e.g., exemplary system 100) provides an Application Program Interface (API) that facilitates access to the contents of the executable file. The API is modeled after the operating system of the target environment of the executable file. For example, for Microsoft PE files, the API is similar to the Windows SDK (Windows software development kit). As an example, if it is desired to find the address of a function by name, GetProcAddress can be called from the Windows SDK.

In one aspect, the CModule class comprise a method, such as:
PVOID GetImageProcAddress(LPCSTR procName)
In another aspect, the CProcess class can have a method, such as:
PVOID GetImageProcAddress(HMODULE hModule, LPCSTR procName, HMODULE*phActualModule=NULL)

When loading from a remote process, the virtual loader (e.g., loader component 110) can account for the fact that the executable file image of the remote process has been parsed by the operating system and converted into a memory image. Such functionality permits adequate and robust (e.g., without unexpected faults) operation of the injection engine (e.g., exemplary system 100) because executable files can be stored on disk differently than in memory. For example, in memory, sections are typically aligned to a memory page, whereas on disk the section typically are stored sequentially to save disk space. The operating system can parse each section and produce the required image. In one exemplary implementation, in the Windows PE case, offsets in files become relative virtual addresses (RVA) in memory, and the final address of an element of the PE is indicated by the RVA added to the module base address.

Based at least on the specification of an executable file format, the virtual loader can process memory image of the module to load, and produce a virtual image of the module in the local process (e.g., a process executed by one of processor(s) 140). The key headers and/or data structures can be copied from the remote process into local structures to create a snapshot, or may be read on demand to get the current values. While all code and data sections may be copied, in the subject disclosure, code and data sections are not copied until the memory is accessed, and then address translation is applied to map remote addresses to local storage buffers. The address translation can be implemented in accordance with aspects described herein. In this fashion, if a function address is queried, while that function address is only valid in the remote process, if it is desired to read the code of that function locally, the virtual loader can detect whether that memory in the remote process has been accessed yet. If not, the virtual loaded (e.g., loader component 110) can copy the memory by section and calculate the desired address in the local buffer and return that address as a pointer to the code.

A virtual loader (e.g., loader component 110) described herein can load executable images for at least two purposes—relocatable parameterized code buffers and virtual process loading. When loading an executable file image from a file for analysis, the executable image need not be formatted in memory in the same fashion as formatted by an operating system that executes the process associated with the executable file image. What is required is that translations are done between file offsets if the memory image of an executable file is read verbatim, and the intended memory image as an operating system loaded it. For example, a Windows PE when loaded into memory by an operating system calculates a function RVA in the following manner:

```
virtual DWORD GetFunctionRVA( WORD ordinal )
{
    const IMAGE_EXPORT_DIRECTORY *pImageExportDirectory =
ImageExportDirectory( );
    // AddressOfFunctions is in context of hmodule
    DWORD rva = ((DWORD *)((ULONG_PTR)mhModule +
                            pImageExportDirectory-
>AddressOfFunctions))[ordinal];
    // function offset is in context of hmodule, and allows getting
actual pCode
    return rva;
}
```

For a module loaded as a file image in memory, the function RVA is calculated thusly:

```
DWORD CalculateFileOffset(DWORD rva)
{
    DWORD offset = 0;
    PIMAGE_SECTION_HEADER pSectionHeader =
GetSectionHeaderByRva(rva);
    if( pSectionHeader != NULL )
        offset = rva - pSectionHeader->VirtualAddress +
            pSectionHeader->PointerToRawData ;
    return offset;
}
DWORD GetFunctionRVA( WORD ordinal )
{
    const IMAGE_EXPORT_DIRECTORY *pImageExportDirectory =
ImageExportDirectory( );
    DWORD offset = CalculateFileOffset(
                            pImageExportDirectory->AddressOfFunctions);
    DWORD rva = ((DWORD *)((ULONG_PTR)mpMappedFile +
offset))[ordinal];
    return rva;
}
```

By supplying various utility routines (e.g., interface(s) 136) inside the classes, a common interface for the loaded modules, mapped closely to one or more Windows APIs, can permit accurate analysis of the virtual modules regardless of load source or internal structure.

The above formulas in the foregoing exemplary code to calculate a function RVA can be derived from the executable file format specification as fields are typically provided in both memory and file offset fashion.

Relocatable Parameterized Code Buffers

Relocatable code buffers are a commonly used to copy code, and are especially useful for copying code into a remote process. Common techniques include copying a function that has been loaded into memory, copying a structured representation of code, or converting a function into a string of bytes and dealing with it as simple data.

Copying code from code memory has the limitation that the code copied can be in the form of the hosting process. If the target process is of different form—such as targeting a different processor—then this technique is not useful. The following is an example of a structured representation of code:

```
#pragma pack(1)
typedef struct
{
    BYTE        PopRdi;
    BYTE        PopRax;
    WORD        IndirectCall0;
    DWORD       EntryNotificationOffset;
```

-continued

```
    BYTE      RelativeCall1;
    DWORD     OriginalCodeOffset;
    WORD      IndirectCall2;
    DWORD     ExitNotificationOffset;
    WORD      PushReturnAddress;
    DWORD     ReturnAddressOffset0;
    BYTE      LockPrefix;
    BYTE      RexPrefix;
    WORD      AndInstruction;
    DWORD     ReturnAddressOffset1;
    BYTE      AndParameter;
    BYTE      RetInstruction;
    LPVOID    ReturnAddress;
    __int64   EntryNotificationToken;
    __int64   ExitNotificationToken;
} NOTIFICATION_STUB;
#pragma pack( )
const NOTIFICATION_STUB CNotificationStub =
{
    0x5f,                // pop rdi
    0x58,                // pop rax
    0x15ff,
    0x00000023,          // call qword ptr [00000023h]
    0xe8,
    OriginalCodeToken,   // call 22222222h
    0x15ff,
    0x00000020,          // call qword ptr [00000020h]
    0x35ff,
    0x0000000a,          // push qword ptr [RETURN_ADDRESS],
    0xf0,
    0x48,
    0x2583,
    0x00000001,
    0x00,                // lock and qword ptr [RETURN_ADDRESS], 0
    0xC3,                // ret
    0x0000000000000000,  // RETURN_ADDRESS: dq 0
    EntryNotificationToken,  // ENTRY_NOTIFICATION: dq
1111111111111111h
    ExitNotificationToken    // EXIT_NOTIFICATION: dq
3333333333333333h
};
```

Such technique can simplify changing operands or operators in code, but it can entail that a programmer literally author the desired code in machine code, or write the code and copy the results into a structure. The latter can comprise, in certain embodiments, significant knowledge of machine code of the target environment to which to the machine code is intended to be copied to in order to ascertain fields that are operands and fields that are operators in order to identify any elements to be modified. At least one advantage of such technique is that the structured code could target any environment and still be manipulated by the host process.

Treating code as a stream of bytes is similar to the structure representation, except for the code would be treated as a single array of characters. At least one advantage of this technique is that the stream of bytes can target any environment and still be manipulated by the host process. Modification in this form requires knowing the offset of each change.

All three techniques support modification, each with varying degrees of ease. One technique compatible with all three techniques would be to put a token value into a desired location to parameterize and simply perform a search and replace, such as replace 0x1111 with some other value. A shortcoming of this approach is that it is significantly general and thus the token may not be unique, and therefore the wrong location can be replaced and the code be broken. Additionally, each modification to the code with the above techniques can require significant effort, or in the case of copying an in memory module, be limited to the platform of the originating process.

Tokenized Code Buffer

When desiring to have relocatable/modifiable code, there are many limitations of the current art—some of the most important or limiting is requiring code that is modified to either be a static buffer which is extremely laborious to maintain, or actual loaded code that has to be compatible with interrogating process. Using the Virtual Process and an intelligent disassembler (e.g., disassembler component described supra) along with code that has been written with tokenized parameters and originates from current process, remote process, or file, the subject disclosure can solve all problems, substantially all problems, or a set of known problems of conventional code injection.

In the subject disclosure, a "tokenized" code can refer to code comprising one or more tokens, whereas "parameterized" code can be refer to tokenized code obtained after at least one token (e.g., all tokens) have been replaced with specific parameters. In certain passages of the disclosure the terms "tokenized code" and "parameterized code" are used interchangeably when the context avoids ambiguity or lack of clarity.

In one aspect, a tokens need to be a value that is not commonly part of a typical program. For example, the following is an example tokenized subroutine in x32 code:

```
pInUseArray          equ 11111111h
Callback             equ 22222222h
_InUseStub@0 PROC
    ; stack
    ; 10 return address
    ; 0c edi
    ; 08 edx
    ; 04 ecx
    ; 00 eax      esp__
    push    edi
    push    edx
    push    ecx
    push    eax
    mov     edi, pInUseArray
    mov     edx, [esp+ 010h];      return address
    mov     ecx, 100              ; Regardless of how
many in use entries allocated, this code hardcoded to 100
    xor     eax, eax
START:
    lock cmpxchg [edi+1], edx   ; compares
InUse.ReturnAddress to 0 (eax)
                                                     ; if
its 0 as well, its available, and it copies edx,
                                                     ; the
return address from the stack, into InUse.ReturnAddress
    jz          SUCCESS
    add     edi, 14                      ; size of IN_USE
record
    xor     eax, eax
    loop    START
    jmp     QUIT
SUCCESS:                                               ; found
empty record
    mov     [esp+010h], edi      ; overwrite return
address on stack with IN_USE record address
QUIT:
    pop     eax
    pop     ecx
    pop     edx
    pop     edi
    jmp     $+5+Callback
InUseArray:
_InUseStub@0 ENDP
```

In one aspect, disassembler component 120 can be utilized to analyze function address (and it may be remote using the virtual process) and generate addresses of all code areas and their length. In one aspect, the disassembler component 120 can copy all code areas and/or lengths into local buffer and fix-up all jmps to local buffer. In yet another aspect, the disassembler component 120 can iterate through all code areas and instructions and seek to replace known tokens with new data which modifies target code. In the subject disclosure, disassembly as implemented herein can comprise an intelligent search/replace. Thus, if token is 1 byte, then only 1 byte operands are looked at. If token is 4 bytes, but is known to be a move, then only move instructions with 4 byte operands is looked at. Write modified code buffer into target process.

As described herein, the token replacement routines use instruction objects of the disassembler (e.g., disassembler component 120) to intelligently replace operands overcoming one or more limitations of conventional systems related to replacement of inadequate tokens that can cause operational issues, especially, yet not exclusively, when such tokens are a byte long. Instruction objects can be retained in a memory (e.g., memory 130, system memory 312 illustrated in FIG. 3, mass storage device 104 . . . ) of a computing device that implements (e.g., executes) code injection or code interception in accordance with aspects described herein.

In one embodiment, an exemplary method for replacing a token comprises iterating through a portion of code by instruction, and not just by byte, and determining if the operand associated with the an instruction matches the token, and in response to a positive determination, replacing with a desired value. In certain implementations, such exemplary method can embody at least one of act 330 or act 340.

Hooking

In certain embodiments, functions are hooked, or intercepted, by overwriting the beginning of the function with an indirect absolute jump to a callback. Code that is overwritten is copied and stored, and when the callback returns, such code is executed before jumping back to the original function body to complete the execution of the hooked, or intercepted, function.

Using various aspects or features of the subject disclosure, an injection engine described herein, via interception configuration component 150, for example, can configure a hook into the code of a process (e.g., target process 104) in a manner substantially safer than implemented in conventional technologies. When configuring hooks, conventional systems typically do not carry out checks at all, or simply check if target code is long enough to fit in a target memory location. Yet, for adequate hooking (e.g., hooking that maintains proper operation of an OS), knowledge of various information, such confirmation the target process is of compatible type for hook, likelihood of collision with existing hooks, validity of an address intended to hook.

Utilizing the virtual process, such analysis can be performed (for example, via loader component 110 and disassembler 120) despite not having any code present in the target process. Such feature is important because code injection may use a hook, and knowledge of (i) suitable code to inject based at least on target process (such as x32 or x64) is necessary, (ii) memory location (e.g., address) to inject, and (iii) likelihood of collisions with other hooking products. Collision is a frequent problem, such as security, hosting, and virtualization products.

Code Injection

Using various aspects or features of the subject disclosure, code injection is greatly improved. Hooks with injection code are safe. In an aspect, processes can load parameterized relocatable injection code regardless of target process. For certain embodiments, injection is desired to load an custom module (e.g., module from OpenSpan, of Alpharetta, Ga.) after the main module and the core OS modules, but before any other modules including statically linked modules or even with Windows Shim engine.

When the target platforms of the interrogating application and target process are identical, injection is very straight forward. Using the Virtual Process and Find call technology, the LdrpLoadDll function, which is a non-exported function, is found. This function is a key element of the loader. When the process is suspended, or its creation caught by a driver event, the Operating System has loaded the main .EXE, ntdll.dll, and kernel32.dll. By finding this function, regardless of where ntdll.dll has been loaded into memory, it can be hooked with a relocatable code buffer that loads the OpenSpan engine.

When injecting into a Wow64 process, which is Windows supporting a non native image (x64 running x32) the process is more complex, but with the above technology no proxy process is required and all benefits are retained. Relocatable code buffers that act as hook callbacks that restore the original code are copied into the target process for the x32 LdrpLoadDll and CpuNotifyDllLoad, and the x64 LdrpLoadDll. When LdrpLoadDll is hooked, if it sees wow64.dll loaded, follows a wow64 injection path and seeks WOW64CPU.dll where it hooks CpuNotifyDllLoad to call the code mentioned above. This code buffer then waits for the x32 LdrLoadDll to be found. Previously, using the Virtual Module technology, the offset in the x32 LdrLoadDll for LdrpLoadDll can be found, and this location can patched to call the x32 LdrpLoadDll relocatable code buffer mentioned above. Then, when the OS transitions into x32 mode, the x32 loader can execute and can hits a custom callback which can inject a custom x32 engine (e.g., an engine provided by OpenSpan from Alpharetta, Ga.) in substantially the same manner as if the custom engine was embodied in native x32 code. In one aspect, the engine can be injected after the main module, ntdll.dll, and kernel32.dll, but before any other module is loaded.

It can be appreciated that the foregoing process exploited the simultaneous analysis of x64 and x32 code from a single process (which could be x32 or x64 itself, but regardless of what the interrogator is, it is compatible with analyzing both x32 or x64 code) and also required the correct parameterizing of both x64 and x32 relocatable tokenized code buffers.

Figure 3:
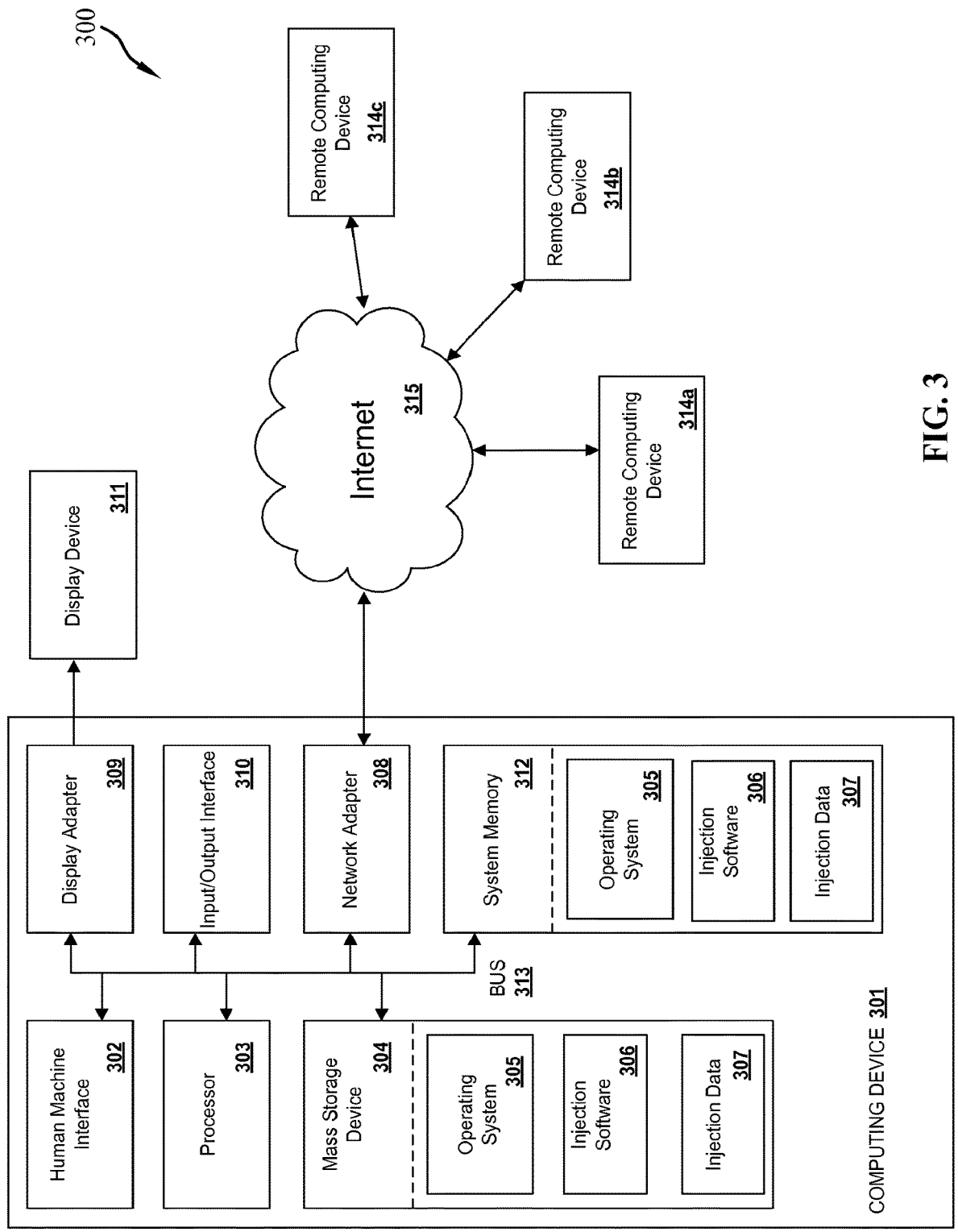
FIG. 3 illustrates an exemplary apparatus for code injection and code interception in accordance with aspects described herein.

FIG. 3 illustrates a block diagram of an example operating environment 300 that enables various features of the subject disclosure and performance of the various methods disclosed herein. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The various embodiments of the subject disclosure can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing effected in the disclosed systems and methods can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

Further, one skilled in the art can appreciate that the systems and methods disclosed herein can be implemented via a general-purpose computing device in the form of a computer 301. The components of the computer 301 can comprise, but are not limited to, one or more processors 303, or processing units 303, a system memory 312, and a system bus 313 that couples various system components including the processor 303 to the system memory 312. In the case of multiple processing units 303, the system can utilize parallel computing.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 313, and all buses specified in this description also can be implemented over a wired or wireless network connection and each of the subsystems, including the processor 303, a mass storage device 304, an operating system 305, injection software 306, injection data 307, a network adapter 308, system memory 312, an Input/Output Interface 310, a display adapter 309, a display device 311, and a human machine interface 302, can be contained within one or more remote computing devices 314*a, b, c* at physically separate locations, connected through buses of this form, in effect implementing a fully distributed system. In an aspect, injection code 306 can comprise loader component 110, disassembler component 120, and interrogator component formed by executing such components, and the like. In one implementation, loader component 110 and disassembler 120 can be embodied in code instructions and executed by processing unit 303. In addition, key values of tokens, results of disassembly function call(s) such as FindCall, various classes related to the disassembly function call(s) also can be retained in injection code 306 and/or injection data 307.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data (such as a group of tokens employed for code buffers) and/or program modules such as operating system 305 and injection software 306 that are immediately accessible to and/or are presently operated on by the processing unit 303. Operating system 305 can comprise OSs such as Windows operating system, Unix, Linux, Symbian, Android, Chromium, and substantially any operating system for wireless computing devices or tethered computing devices.

In another aspect, the computer 301 also can comprise other removable/nonremovable, volatile/non-volatile computer storage media. By way of example, FIG. 3 illustrates a mass storage device 304 which can provide non-volatile storage of computer code, computer readable instructions, data structures, program modules, and other data for the computer 301. For example and not meant to be limiting, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305 injection software 306. Each of the operating system 305 and injection software 306 (or some combination thereof) can comprise elements of the programming and the injection software 306. Data and code (e.g., computer-executable instruction(s)) can be retained as part of injection software 306 and can be stored on the mass storage device 304. Injection software 306, and related data and code, can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In one aspect, injection code 306 can comprise computer-executable instructions that can configure processor 303, which can embody one or more processor(s) 140, to perform the various methods disclosed in the subject specification and annexed drawings.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, a display device 311 also can be connected to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via Input/Output Interface 310. Any step and/or result of the methods can be output in any form to an output device. Such output can be any form of visual representation, including, but not limited to, textual, graphical, animation, audio, tactile, and the like.

The computer 301 can operate in a networked environment using logical connections to one or more remote computing devices 314a, b, c. By way of example, a remote computing device can be a personal computer, portable computer, a server, a router, a network computer, a peer device or other common network node, and so on. Logical connections between the computer 301 and a remote computing device 314a,b,c can be made via a local area network (LAN) and a general wide area network (WAN). Such network connections can be through a network adapter 308. A network adapter 308 can be implemented in both wired and wireless environments. Such networking environments are conventional and commonplace in offices, enterprise-wide computer networks, intranets, and the Internet 315.

As an illustration, application programs and other executable program components such as the operating system 305 are illustrated herein as discrete blocks, although it is recognized that such programs and components reside at various times in different storage components of the computing device 305, and are executed by the data processor(s) of the computer. An implementation of injection software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer-readable media can comprise "computer storage media," or "computer-readable storage media," and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 4:
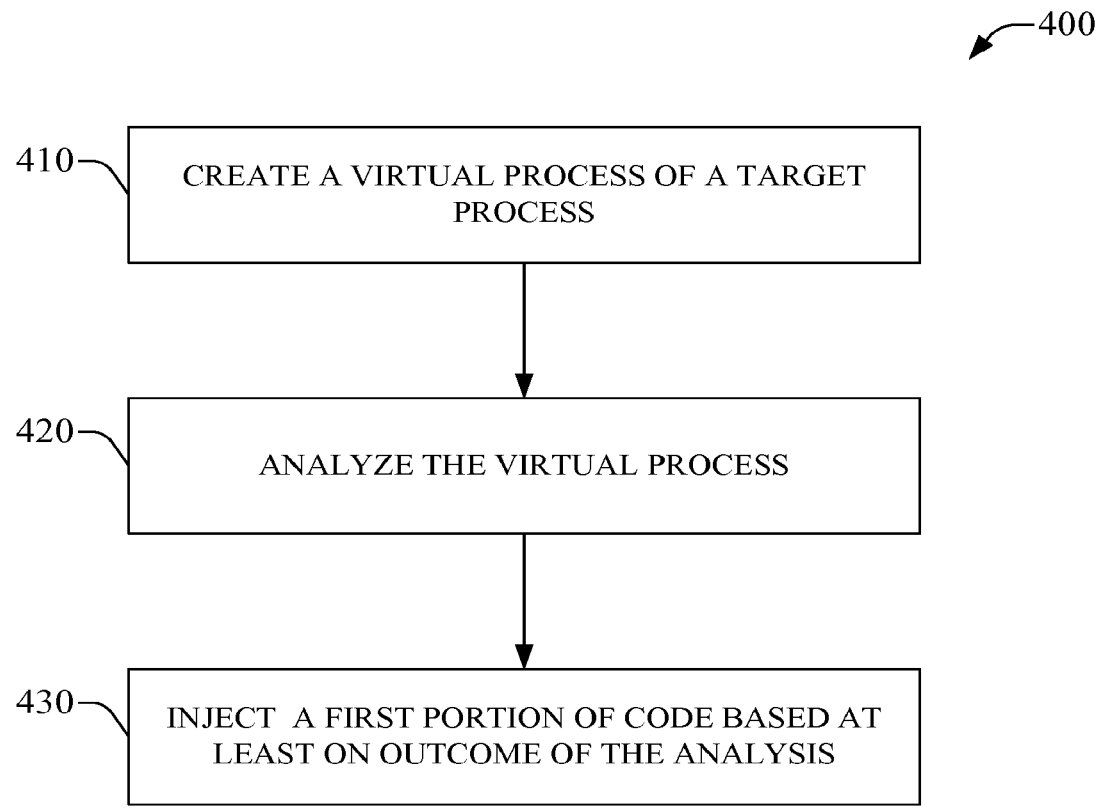
FIGS. 4-5 illustrate exemplary methods for injecting code and/or intercepting code in accordance with aspects described herein.
Figure 5:
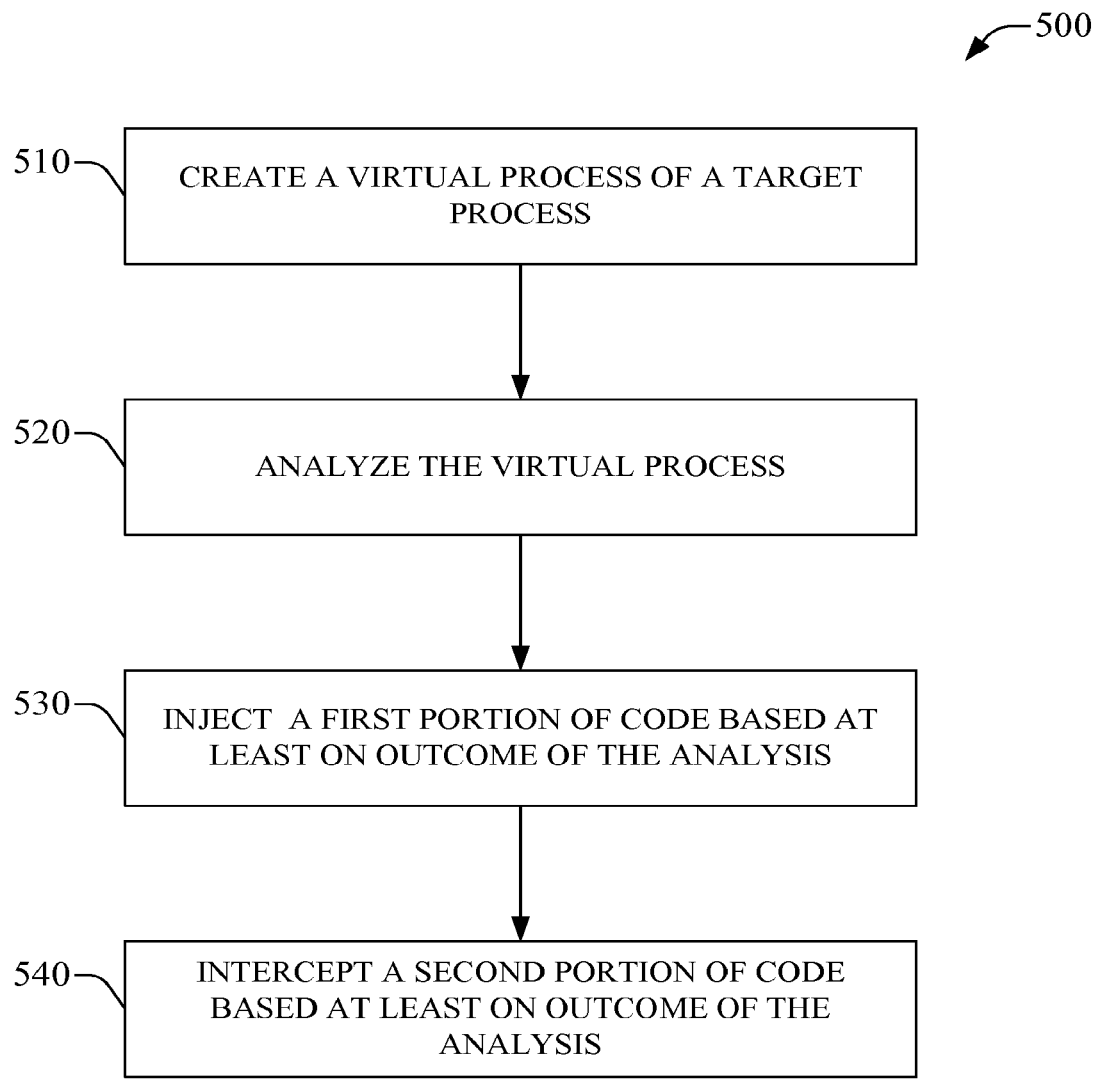

In view of the aspects described herein, exemplary methods that can be implemented in accordance with the disclosure can be better appreciated with reference to the flowcharts in FIGS. 4-5. For purposes of simplicity of explanation, the exemplary methods disclosed herein are presented and described as a series of acts. However, it is to be understood and appreciated that the claimed subject matter is not limited by the order of acts, as some acts may occur in different orders and/or concurrently with other acts from that shown and described herein. For example, the various methods or processes of the subject disclosure can alternatively be represented as a series of interrelated states or events, such as in a state diagram. Furthermore, not all illustrated acts may be required to implement a method in accordance with the subject disclosure. Further yet, two or more of the disclosed methods or processes can be implemented in combination with each other, to accomplish one or more features or advantages herein described.

It should be further appreciated that the exemplary methods of the disclosure can be stored on an article of manufacture, or computer-readable medium, to facilitate transporting and transferring such methods to a computing device (e.g., a desktop computer, a mobile computer, a mobile telephone, a blade computer, a programmable logic controller, and the like) for execution, and thus implementation, by a processor of the computing device or for storage in a memory thereof.

FIG. 4 is a flowchart of an example method 400 for injecting code or intercepting code in accordance with aspects of the subject disclosure. At act 410, a virtual process of a target process is created. As described hereinbefore, in an aspect, loader component 110 can create the virtual process by exploiting (e.g., executing) an API. In an alternative or additional aspect, the API can be part of the loader component 110, which can be executed by a processor (e.g., processor 140). Act 410 can be referred to as a creating action. In one aspect, the creating action can comprise creating the virtual process associated with the target process during initialization of the target process. In another aspect, the creating action can comprise loading a library of tokenized code. In another aspect, the creating action can comprise loading a module from a persistent computer-readable medium. In another aspect, the creating action comprises loading a module from a local memory. In certain implementations, the loading action comprises loading a dynamic link library of relocatable parameterized code. As described herein, relocatable parameterized code can be relocatable tokenized code in which one or more tokens are replaced by an instance of a specific parameter value. In another aspect, the creating action comprises loading a module into a memory space from a memory image of the target process. In another aspect, the creating action further comprises translating a memory address in the memory image of the target process into a memory address in local storage. In another aspect, the creating action comprises generating a memory map of at least one base allocation of the target process. In another aspect, the creating action comprises copying at least one data structure from a memory image of the target process. In yet another aspect, the creating action further comprises copying data pointed to in the at least one data structure into local memory. In still another aspect, the creating action can comprise loading a plurality of modules, at least two modules of the plurality of modules having disparate executable file formats.

At act 420, the virtual process is analyzed. A loader component (e.g., component 110) and a disassembler component (e.g., component 120) can analyze the virtual process as described supra. Act 420 can be referred to as the analyzing action. In one aspect, the analyzing action comprises querying a module of the plurality of modules via an application programming interface (API) comprising at least one instruction object. In another aspect, the analyzing action comprises determining compatibility of the first portion of code with the target process. In another aspect, the analyzing action comprises determining a type of the target process. In yet another aspect, the analyzing action comprises identifying, by applying a disassembly function call to a first function call, a second functional call nested in the first function call. In another aspect, the analyzing action can comprise identifying a base address for a module in the virtual process, and determining if a code interception associated with the module and the base address is present. In yet another aspect, the analyzing action further comprises loading a version of the module without the code interception in response to the determining action indicating that the code interception is present. In still another aspect, the analyzing can further comprise identifying an inner function call of the module in the virtual process and a relative virtual address (RVA) of the inner functional call by applying at least one disassembly function call to the clean version of the module without the code interception, the at least one disassembly function call having a queryable function. In a further aspect, the analyzing action further comprises determining an actual address of the inner call in the target process by adding the RVA and an offset.

In another aspect, the analyzing action can comprise generating at least one instruction object and a length of a code buffer associated with the virtual process. Here, generating the length of the code buffer can comprises detecting termination of a function call. In addition or in the alternative, generating the length of the code buffer comprises detecting a return of a function call.

At act 430, a first portion of code is injected based at least on outcome of the analysis. Injecting code can be accomplished in accordance with various aspects described herein; the loader component 110 and/or the disassembler component 120 can implement act 430. Act 430 can be referred to as the injecting action. In one aspect, the injecting action comprises injecting code after a kernel library is loaded and before a module associated with the target process is loaded. In another aspect, the injecting action comprises injecting code subsequent to loading of main module, ntdll.dll, and kernel32.dll, and prior to loading of a module associated with the target process.

FIG. 5 illustrates a flowchart of an exemplary method for intercepting code in accordance with aspects of the subject disclosure. Acts 510 through 530 can be implemented in substantially the same manner as acts 410-430. At act 540, a second portion of code is intercepted based at least on outcome of the analysis. Interception of code can be accomplished in accordance with various aspects described herein; the loader component (e.g., 110) and the disassembler component (e.g., component 120) can implement act 540. Act 540 can be referred to as the intercepting action. In one aspect, the intercepting action can comprise translating a memory address. In another aspect, the intercepting action comprises replacing a token in accordance with aspects described herein. For example, replacing the token can comprise allocating memory, in the target process, for at least one or more of a code buffer associated with a first portion of the code or data associated with a second portion of the code; calculating data values via an allocated base address of the allocated memory; and replacing an operand associated with the token via a tokenizing API, the operand being further associated with a function address or a data address. Replacing the operand associated with the token can comprise iterating through a portion of code by instruction; for an instruction having the operand, determining if the instruction matches the token; and replacing the operand with a predetermined value in response to the determining action indicating the instruction matches the token.

In exemplary method 500, the analyzing action can comprise determining validity of a memory address intended for intercepting the second portion of code at act 540. In one aspect, the analyzing action can comprise probing validity of a memory address intended for intercepting the second portion of code. In another aspect, the analyzing action can comprise determining a collision likelihood for the second portion of code with a disparate portion of code. In yet another aspect, the analyzing action can comprise determining compatibility of the second portion of code with the target process.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Only reasonable and routine experimentation is required to adapt the disclosed examples to specific code injection or code interception scenarios.

Various aspects of copying modifiable assembly routine (e.g., computer-executable instructions) into memory are illustrated herein. One exemplary assembly routine can be the following:

```
    push    eax
    call    dword ptr GetCurrentProcessId
    cmp     eax, 0x12345678         ; literal process id
    pop     eax
    jnz     SKIP_CALLBACK
    jmp     dword ptr [CallbackAddress]    ; absolute indirect jump
    CallbackAddress dd 0x12345678  ; dword contains address
SKIP_CALLBACK:
    jmp     dword ptr [NextHookAddress]    ; absolute indirect jump
    NextHookAddress dd 0x12345678
```

In one scenario, it is desired to copy such assembly routine into a memory space of a process and modify certain operand(s) and/or data with values specific for the target process. At least two techniques are available to implement such code injection and modification. As an illustration, one of such technique can comprise creation of a structure that can represent the machine code for the foregoing assembly routine. One such structure can be, for example, the following:

```
#pragma pack(1)
typedef struct tagOpcodeShort
{
    BYTE    opcode;
    __int8  data;       // 8 bit signed integer
} OPCODE_SHORT;
#pragma pack( )
#pragma pack(1)
typedef struct tagOpcodeDword
{
    BYTE    opcode;
    DWORD   data;
} OPCODE_DWORD;
#pragma pack( )
#pragma pack(1)
typedef struct tagIndirectAbsoluteJmp
{
    // jmp [target]
    // target dd 0x00000000
    BYTE            Opcode;
    // 0xFF
    BYTE            modRm;
    // 0x25, 00101001,
    // Mod = 00, Reg = 100, R/M = 101 : 32 bit displacement follows
    LPVOID          Target;
    // &(absolute target) which is pointer to an address (32 bits)
    LPVOID          AbsoluteAddress;
} INDIRECT_ABSOLUTE_JMP;
#pragma pack( )
```

Using the structure presented supra, the foregoing exemplary assembly routine can be represented by following structure:

```
#pragma pack(1)
typedef struct tagSharedMemoryStub
{
```

```
BYTE            pushEax;                    // 50h
OPCODE_DWORD callGetCurrentProcessId;       // e8h
GetCurrentProcessId
OPCODE_DWORD    cmpEax;                     // 3dh Value
BYTE            popEax;                     // 58h
OPCODE_SHORT jnz;                           // 75h Target, Target is 0ah
INDIRECT_ABSOLUTE_JMP jmpCallback;          // ffh 25h &target
                                            target
INDIRECT_ABSOLUTE_JMP jmpNextHook;          // ffh 25h &target
                                            target
}SHARED_MEMORY_STUB;
#pragma pack( )
```

It should be noted that the comments (represented with "//") in the foregoing representation are the actual machine code that is being represented.

A template for the assembly routine can be defined for elements that are not modified, as illustrated below:

```
    const SHARED_MEMORY_STUB CSharedMemoryStub =
    {
       0x50,
       { 0xe8, NULL },
       { 0x3d, NULL },
       0x58,
       { 0x75, 0x0a },
       { 0xff, 0x25, NULL, NULL },
       { 0xff, 0x25, NULL, NULL }
    };
```

Using the functional sizeof(SHARED_MEMORY_STUB) defined supra, memory to contain the assembly routine can be allocated in a process.

In one aspect, given SHARED_MEMORY_STUB*s, and assuming s can be allocated in a process, the following exemplary code snippet can complete the assembly routine assuming certain parameters of processes, callbackAddress, and nextHookAddress:

```
// Copy in template
*s = CSharedMemoryStub;
// Modify based on parameters
// Call address of GetCurrentProcessId must be relative to our
// allocated buffer.
s->callGetCurrentProcessId.data = (DWORD)GetCurrentProcessId -
    ( (DWORD)&(s->callGetCurrentProcessId.data) + sizeof(DWORD) );
s->cmpEax.data = GetCurrentProcessId( );
s->jmpCallback.Target = &(s->jmpCallback.AbsoluteAddress);
s->jmpCallback.AbsoluteAddress = callbackAddress;
s->jmpNextHook.Target = &(s->jmpNextHook.AbsoluteAddress);
s->jmpNextHook.AbsoluteAddress = nextHookAddress;
```

In another aspect, the following exemplary code can permit to disassemble the assembly routine for validation:

```
// Disassemble for validation
CFunction d;
d.Initialize(s);
_tprintf( _T("%s\n"), d.ToString(NULL, 0, TRUE) );
```

The foregoing exemplary code can produce the following result—here, addresses 716E0014 and 716E001E are data locations that are not disassembled:

```
716E0000 sub_716E0000:                             ; function entry point
716E0000  push     eax
716E0001  call     +B129948h (7C80994Eh)           ; GetCurrentProcessId
          (kernel32.dll)
716E0001
716E0006  cmp      eax, 3D4h
716E000B  pop      eax
716E000C  jnz      loc_716E0018
716E000C
716E000E  jmp      dword ptr [716E0014h]
716E000E
716E000E ; --------------------------------------------------------
716E000E
716E0018 loc_716E0018:
716E0018  jmp      dword ptr [716E001Eh]
```

One advantage of the technique described hereinbefore is that it affords straightforward access to operands via the structure that can represent the assembly routine. However, such technique can present certain complexities in that manual assembling of machine code may be necessary; the machine code can be difficult to read and/or create; and logic can be difficult to modify.

As another illustration, another technique that exploits the capabilities of Inline Assembler can be utilized for code injection and modification. In one aspect, the example technique can comprise writing an assembly routine (e.g., the exemplary assembly routing presented supra) using one or more tokens and copying the routine out of memory. Such technique can permit modifying the assembly routine by replacing a token of the one or more tokens.

For example, the following routine and macros can be defined as part of implementation of such technique. Comments are indicated with the symbol "//".

```
// DWORD tokens
#define TOKEN1 0x11111111
#define TOKEN2 0x22222222
#define TOKEN3 0x33333333
#define TOKEN4 0x44444444
#define TOKEN5 0x55555555
#define TOKEN6 0x66666666
#define TOKEN7 0x77777777
// BYTE tokens for data locations
#define TOKEN1_BYTE 0x11
#define TOKEN2_BYTE 0x22
#define TOKEN3_BYTE 0x33
#define TOKEN4_BYTE 0x44
#define TOKEN5_BYTE 0x55
#define TOKEN6_BYTE 0x66
#define TOKEN7_BYTE 0x77
```

```
#define TOKEN8_BYTE 0x88
#define TOKEN9_BYTE 0x99
// For relative jmp, the assembler is expecting a label.
// We simulate the label by using '$', the current location counter
//   and add 5 to get passed the jmp opcode and 4 byte address, and
//   then add the token
#define RELATIVE_OFFSET_TOKEN(a) $+5+a
// Inline assembler cannot define data, but we can simulate by
// emitting bytes, DD is 4 bytes (DWORD)
#define DD(a) __asm_emit a __asm_emit a __asm_emit a __asm_emit a
// We need address locations for proper assembly
DWORD CallbackAddress;
DWORD NextHookAddress;
_asm
{
BEGIN:
        push    eax
        call    RELATIVE_OFFSET_TOKEN(TOKEN1)
        cmp     eax, TOKEN2
        pop     eax
        jnz     SKIP_CALLBACK
        jmp     dword ptr [CallbackAddress]     // Address of TOKEN3
        DD(TOKEN3_BYTE)                          // callbackAddress
    SKIP_CALLBACK:
        jmp     dword ptr [NextHookAddress]     // Address of TOKEN4
        DD(TOKEN4_BYTE)                          // nextHookAddress
END:
}
```

In one aspect, to find an address of the assembly routine and size thereof for allocation of copy buffers, the following code snippet can be provided:

```
    LPVOID      pCode;
    DWORD       codeSize;
    _asm
    {
        mov     eax, offset BEGIN
        mov     [pCode], eax
        mov     edx, offset END
        sub     edx, eax
        mov     [codeSize], edx
    }
```

Provided a buffer, and the address of the assembly routine and size thereof, acquiring the assembly data is as easy as a copy:

```
// Copy in code image
memcpy( buffer, pCode, codeSize );
```

In one aspect, tokens can be replaced by implementing, for example, the following code:

```
ReplaceRelativeOffset( buffer, codeSize, TOKEN1,
    GetCurrentProcessId );
ReplaceDword( buffer, codeSize, TOKEN2, processId );
ReplaceAbsoluteJmpAddress( buffer, codeSize, TOKEN3,
    callbackAddress );
ReplaceAbsoluteJmpAddress( buffer, codeSize, TOKEN4,
    nextHookAddress );
```

In one implementation, the ReplaceDword token replacement routine can be defined as follows.

```
BOOL ReplaceDword( BYTE *buffer, DWORD bufferSize, DWORD token, DWORD value )
{
    BOOL result = FALSE;
    for( DWORD i=0; i < bufferSize-sizeof(DWORD)+1; i++ )
    {
        if( memcmp( &buffer[i], &token, sizeof(DWORD) ) == 0 )
        {
            memcpy( &buffer[i], &value, sizeof(DWORD) );
            result = TRUE;
            break;
        }
    }
    return result;
}
```

In one implementation, the ReplaceRelativeOffset token replacement routine can be defined as follows.

```
BOOL ReplaceRelativeOffset( BYTE *buffer, DWORD bufferSize,
    DWORD token, LPVOID address )
{
    BOOL result = FALSE;
    for( DWORD i=0; i<bufferSize-sizeof(DWORD)+1; i++ )
    {
        if( memcmp( &buffer[i], &token, sizeof(DWORD) ) == 0 )
        {
            // We found location of address
            DWORD offset = (DWORD)address - (DWORD)buffer -
                                            (i+sizeof(DWORD));
            memcpy( &buffer[i], &offset, sizeof(DWORD) );
            result = TRUE;
            break;
        }
    }
    return result;
}
```

In one implementation, the ReplaceAbsoluteJmpAddress token replacement routine can be defined as follows.

```
// Replaces given token with a relative offset to given address
// The offset will be calculated from the offset of the token
within the buffer.
// This routine assumes the following format:
//     jmp [target]   ; 0xff 0x25 0x
// DD target
BOOL ReplaceAbsoluteJmpAddress( BYTE *buffer, DWORD bufferSize,
DWORD token, LPVOID address )
{
    BOOL result = FALSE;
    for( DWORD i=0; i<bufferSize-sizeof(DWORD)+1; i++ )
    {
        if( memcmp( &buffer[i], &token, sizeof(DWORD) ) == 0 )
        {
            // We found location of address
            DWORD target = (DWORD)&buffer[i];
            DWORD absoluteTarget = (DWORD)address;
            memcpy( &buffer[i-sizeof(DWORD)], &target, sizeof(DWORD)
);
            memcpy( &buffer[i], &absoluteTarget, sizeof(DWORD) );
            result = TRUE;
            break;
        }
    }
    return result;
}
```

Disassembly of the above token replacement routines can yield the following:

```
716E0000 sub_716E0000:                    ; function entry point
716E0000    push    eax
716E0001    call    +B129948h (7C80994Eh) ; GetCurrentProcessId
(kernel32.dll)
716E0001
716E0006    cmp     eax, 978h
716E000B    pop     eax
716E000C    jnz     loc_716E0018
716E000C
716E000E    jmp     dword ptr [716E0014h]
716E000E
716E000E    ; --------------------------------------------------
716E000E
716E0018 loc_716E0018:
716E0018    jmp     dword ptr [716E001Eh]
```

The foregoing outcome is identical or substantially identical to the disassembly outcome achieved with the structure technique described herein, as pertinent parameters in both described techniques are the same.

The exemplary technique that utilizes tokes and replacement thereof has at least the advantage of simplicity and associated mitigation of errors. In one aspect, such technique can mitigate or eliminate manual assembling into machine code and therefore the technique is substantially easier to create and/or modify, with substantially less errors, than techniques for code injection and modification that rely on machine code. In certain scenarios, some instructions are difficult to emulate (or "fake") and thus a structure-based technique can serve to complement or replace a token-based technique, especially, yet not exclusively, when hand-coding machine code is necessary.

As an illustration, is the token-based routine in its entirety:

```
void WINAPI GetSharedMemoryStubBuffer( BYTE *buffer, DWORD
*bufferSize,
                                        DWORD processId, LPVOID
callbackAddress, LPVOID nextHookAddress )
{
    // Locations for absolute jump simulation so inline assembly is
correct
        static   DWORD   CallbackAddress = 0xcccccccc;
        static   DWORD   NextHookAddress = 0xcccccccc;
        LPVOID   pCode;
        DWORD    codeSize;
    _asm
    {
        mov     eax, offset BEGIN
        mov     [pCode], eax
        mov     edx, offset END
        sub     edx, eax
        mov     [codeSize], edx
    }
    if( bufferSize != NULL )
        *bufferSize = codeSize;
    if( buffer == NULL )
        return;
    // Copy in code image
    memcpy( buffer, pCode, codeSize );
    // Replace tokens
    ReplaceRelativeOffset( buffer, codeSize, TOKEN1,
GetCurrentProcessId );
    ReplaceDword( buffer, codeSize, TOKEN2, processId );
    ReplaceAbsoluteJmpAddress( buffer, codeSize, TOKEN3,
callbackAddress );
    ReplaceAbsoluteJmpAddress( buffer, codeSize, TOKEN4,
nextHookAddress );
    // Disassemble for validation
    CFunctionParse c(buffer);
    _tprintf( _T("%s\n"), c.ToString(NULL, 0, TRUE) );
    return;
    // SharedMemoryStub
    _asm
    {
```

```
BEGIN:
    push    eax
    call    RELATIVE_OFFSET_TOKEN(TOKEN1)    // GetCurrentProcessId
relative displacement
    cmp     eax, TOKEN2                      // Current ProcessId
    pop     eax
    jnz     SKIP_CALLBACK
    jmp     dword ptr [CallbackAddress]      // Address of TOKEN3
    DD(TOKEN3_BYTE)                          // callbackAddress
SKIP_CALLBACK:
    jmp     dword ptr [NextHookAddress]      // Address of TOKEN4
    DD(TOKEN4_BYTE)                          // nextHookAddress
END:
    }
}
```

In one exemplary implementation scenario, the foregoing routine can be called with NULL argument for the buffer to obtain the code size, suitable memory can be allocated for the code size, and then the foregoing routine can be called again with the buffer, and the desired parameters, and an accurate function in the target memory is returned.

As described herein, utilizing a virtual process and a virtual module in accordance with aspects of the disclosure, various shortcomings of conventional technologies for managing processes that are incompatible with a platform or subsystem. For example, utilizing a virtual process, which manage a virtual modules, the following code snippet can load a 32-bit module into an x64 process:

```
wchar_t modulePath[MAX_PATH];
if( BuildNativeFilePath( modulePath, MAX_PATH,
L"OpenSpan.Sinon.x32.dll" ) == FALSE )
{
    Trace( TraceSource::Injection, TraceLevel::Error, L"%S -
BuildNativeFilePath Failed!", __FUNCTION__ );
    return FALSE;
}
```

```
HMODULE hSinon32 = gpProcess->LoadModule(modulePath);
if( hSinon32 == NULL )
{
    Trace( TraceSource::Injection, TraceLevel::Error, L"%S -
LoadModule( %s ) Failed!", __FUNCTION__, modulePath );
    return FALSE;
}
PVOID pLdrpLoadDll32Hook = gpProcess->GetImageProcAddress
(hSinon32, 102);
if( pLdrpLoadDll32Hook == NULL )
{
    Trace( TraceSource::Injection, TraceLevel::Error, L"%S -
Unable to query #102.", __FUNCTION__ );
    return FALSE;
}
```

In one aspect, the pLdrpLoadDll32Hook is a tokenized assembly routine—note that as long as the code is relocatable, the code can be written in a high level language, such as 'C', when compilation optimizations and runtime checks are disabled.

The following is an example of preparing a code buffer and calculating replacement data:

```
CFunction ldrpLoadDllHook32Stub;
if( ldrpLoadDllHook32Stub.Initialize( NULL, pLdrpLoadDll32Hook, NULL, FALSE ) )
{
    DWORD_PTR codeStart, codeEnd;
    if( ldrpLoadDllHook32Stub.IsRelocatable( codeStart, codeEnd) == TRUE )
    {
        size_t codeLength = codeEnd - codeStart + 1;
        DWORD padding = (4 - (codeLength % 4 ) ) % 4;
        codeLength+=padding;
        size_t bufferLength = codeLength + sizeof(LDRP_LOAD_DLL_DATA_32);
        if( version == 4 )
            bufferLength+=sizeof(INJECTION_DATA_4);
        else
            bufferLength+=sizeof(INJECTION_DATA_5);
        pLdrpLoadDllCallback = AllocateProcessVirtualMemory( targetProcess.Handle( ),
(DWORD)bufferLength );
        if( pLdrpLoadDllCallback != NULL )
        {
            // Buffer is CODE[CodeLength] - LDRP_LOAD_DLL_DATA_32 -
INJECTION_DATA_X
            DWORD_PTR pData = (DWORD_PTR)pLdrpLoadDllCallback +
codeLength;
            pLdrpLoadDllSpot = (PVOID)(pData +
offsetof(LDRP_LOAD_DLL_DATA_32, pfnLdrpLoadDll));
            pLdrLoadDllSpot = (PVOID)(pData +
offsetof(LDRP_LOAD_DLL_DATA_32, pfnLdrLoadDll));
            pLdrGetProcedureAddress Spot = (PVOID)(pData +
offsetof(LDRP_LOAD_DLL_DATA_32, pfnLdrGetProcedureAddress));
            PVOID pSearchPath = (PVOID)(pData +
offsetof(LDRP_LOAD_DLL_DATA_32, SearchPath));
            PVOID pDllBuffer = (PVOID)(pData +
```

-continued

```
offsetof(LDRP_LOAD_DLL_DATA_32, DllBuffer));
      PVOID pDllUnicode = (PVOID)(pData +
offsetof(LDRP_LOAD_DLL_DATA_32, DllName));
      PVOID      pFunctionNameBuffer = (PVOID)(pData +
offsetof(LDRP_LOAD_DLL_DATA_32, FunctionBuffer));
      PVOID pFunctionNameAnsi = (PVOID)(pData +
offsetof(LDRP_LOAD_DLL_DATA_32, FunctionName));
      PVOID pInjectionDataAddress = (PVOID)(pData +
sizeof(LDRP_LOAD_DLL_DATA_32));
      CopiedCode copiedCode;
      wchar_t systemPath[MAX_PATH];
      if( GetOSArchitecture( ) == OSArchitecture::x64 )
      {
         if( _GetSystemWow64DirectoryW(systemPath, MAX_PATH) != 0 )
                OpenSpan::Path::Combine( systemPath, MAX_PATH,
systemPath, L"ntdll.dll" );
         else
                OpenSpan::Path::Combine( systemPath, MAX_PATH,
L"c:\\windows\\syswow64\\", L"ntdll.dll");
      }
      else
      {
         if(_GetSystemDirectoryW(systemPath, MAX_PATH) != 0 )
                OpenSpan::Path::Combine( systemPath, MAX_PATH,
systemPath, L"ntdll.dll" );
         else
                OpenSpan::Path::Combine( systemPath, MAX_PATH,
L"c:\\windows\\system32\\", L"ntdll.dll");
      }
      // Get LdrpLoadDll from file.
      if( CopyPatchCode(systemPath, "LdrpLoadDll", &copiedCode ) == TRUE )
      {
         result = DoInjectLdrpLoadDll32Hook( targetProcess,
                                       pLdrpLoadDllCallback,
                            bufferLength,
                            code Start,
                            codeLength,
                            pLdrpLoadDll,
                            copiedCode,
                            pLdrLoadDll,
                            pLdrGetProcedureAddress,
                            pLdrpLoadDllSpot,
                            pLdrLoadDllSpot,
                            pLdrGetProcedureAddressSpot,
                            pSearchPath,
                            DllBuffer,
                            pDllUnicode,
                            pFunctionNameBuffer,
                            pFunctionNameAnsi,
                            pInjectionDataAddress,
                            version,
                            pInjectionData);
```

In another aspect, the following code illustrates utilization of a tokenizing API to finalize the buffer result:

```
static BOOL DoInjectLdrpLoadDll32Hook( CProcess& targetProcess,
    PVOID pLdrpLoadDllCallback,    // Address of hook callback in
target process
    size_t bufferLength,           // length of hook callback buffer
    DWORD_PTR codeStart,           // start of code
    DWORD_PTR codeLength,          // length of code
    PVOID pLdrpLoadDll,            // Patch location
    CopiedCode& copiedCode,        // copied code from patch location
    PVOID pLdrLoadDll,
    PVOID pLdrGetProcedureAddress,
    PVOID pLdrpLoadDllSpot,
    PVOID pLdrLoadDllSpot,
    PVOID pLdrGetProcedureAddressSpot,
    PVOID pSearchPath,
    PVOID DllBuffer,
    PVOID pDllUnicode,
    PVOID pFunctionNameBuffer,
    PVOID pFunctionNameAnsi,
```

```
  PVOID pInjectionDataAddress,
  DWORD version,
  PVOID pInjectionData )
{
  BOOL result = FALSE;
  PVOID pBuffer = malloc(bufferLength);
  if( pBuffer!=NULL )
  {
     __try// __finally
     {
        __try //__except
        {
           memset( pBuffer, 0, bufferLength );
           // Copy in code
           memcpy( pBuffer, (PVOID)codeStart, codeLength
);
           // Tokenize Code
           BOOL tokenizing = TRUE;
           if( ReplaceImmediateDword( pBuffer,
(DWORD)codeLength, LdrpLoadDll32SpotTokenDword,
(DWORD)pLdrpLoadDllSpot ) == FALSE )
              tokenizing = FALSE;
           if( ReplaceImmediateDword( pBuffer,
(DWORD)codeLength, CopiedDataToken, copiedCode.data1 ) == FALSE )
              tokenizing = FALSE;
           if( ReplaceImmediateDword( pBuffer,
(DWORD)codeLength, CopiedData2Token, copiedCode.data2 ) == FALSE )
              tokenizing = FALSE;
           if( ReplaceImmediateDword( pBuffer,
(DWORD)codeLength, DllUnicodeAddress32TokenDword,
(DWORD)pDllUnicode ) == FALSE )
              tokenizing = FALSE;
           if( ReplaceImmediateDword( pBuffer,
(DWORD)codeLength, SearchPathAddress32TokenDword,
(DWORD)pSearchPath ) == FALSE )
              tokenizing = FALSE;
           if( ReplaceImmediateDword( pBuffer,
(DWORD)codeLength, LdrLoadDll32SpotTokenDword,
(DWORD)pLdrLoadDllSpot ) == FALSE )
              tokenizing = FALSE;
           if( ReplaceImmediateDword( pBuffer,
(DWORD)codeLength, FunctionNameAnsiAddress32TokenDword,
(DWORD)pFunctionNameAnsi ) == FALSE )
              tokenizing = FALSE;
           if( ReplaceImmediateDword( pBuffer,
(DWORD)codeLength, LdrGetProcedureAddress32SpotTokenDword,
(DWORD)pLdrGetProcedureAddressSpot ) == FALSE )
              tokenizing = FALSE;
           if( ReplaceImmediateDword( pBuffer,
(DWORD)codeLength, InjectionDataAddress32TokenDword,
(DWORD)pInjectionDataAddress ) == FALSE )
              tokenizing = FALSE;
           if( tokenizing == TRUE )
           {
              // Assign data
              LDRP_LOAD_DLL_DATA_32 *pData =
(LDRP_LOAD_DLL_DATA_32 *)((DWORD_PTR)pBuffer + codeLength);
              // x32 injection we know these addresses
as we patch it directly
              pData->pfnLdrpLoadDll =
(DWORD)pLdrpLoadDll;
              pData->pfnLdrLoadDll =
(DWORD)pLdrLoadDll;
              pData->pfnLdrGetProcedureAddress =
(DWORD)pLdrGetProcedureAddress;
              wchar_t binaryPath[255];
              GetNativeModulePath( binaryPath, 255 );
  OpenSpan::Path::RemoveFileSpec(binaryPath);
              wcscpy_s( pData->SearchPath, 256,
binaryPath );
              wcscpy_s( pData->DllBuffer,
sizeof(pData->DllBuffer)/sizeof(wchar_t), L"OpenSpan.Scout.x32.dll"
);
```

```
            pData->DllName.Length =
(WORD)(wcslen(pData->DllBuffer)*2);
            pData->DllName.MaximumLength =
(WORD)(wcslen(pData->DllBuffer)*2 + 2);
            pData->DllName.pBuffer =
(DWORD)DllBuffer;
              strcpy_s( (char *)pData->FunctionBuffer,
sizeof(pData->FunctionBuffer)/sizeof(char), "OpenSpanInitialize");
            pData->FunctionName.Length =
(WORD)strlen(pData->FunctionBuffer);
            pData->FunctionName.MaximumLength =
(WORD)strlen(pData->FunctionBuffer)+1;
            pData->FunctionName.pBuffer =
(DWORD)pFunctionNameBuffer;
            // Copy in injection data
            if( version == 4 )
                memcpy( (PVOID) (
(DWORD_PTR)pBuffer + codeLength + sizeof(LDRP_LOAD_DLL_DATA_32) ),
pInjectionData, sizeof(INJECTION_DATA_4) );
            else
                memcpy( (PVOID) (
(DWORD_PTR)pBuffer + codeLength + sizeof(LDRP_LOAD_DLL_DATA_32) ),
pInjectionData, sizeof(INJECTION_DATA_5) );
            DWORD oldProtect;
            // Note our buffer is code and data and
needs to be EXECUTE_READWRITE since it modifies itself
            if( _VirtualProtectEx(
targetProcess.Handle( ), pLdrpLoadDllCallback, bufferLength,
PAGE_EXECUTE_READWRITE, &oldProtect ) == TRUE )
          {
              SIZE_T bytesWritten;
              if( _WriteProcessMemory(
targetProcess.Handle( ), pLdrpLoadDllCallback, (PVOID)pBuffer,
bufferLength, &bytesWritten ) == TRUE )
                {
                  result = TRUE;
                }
                else
                {
  TraceLastError(TraceSource::Injection, __FUNCTION__,
L"_WriteProcessMemory" );
                  if(
_VirtualFreeEx(targetProcess.Handle( ), pLdrpLoadDllCallback, 0,
MEM_RELEASE) == FALSE )
     TraceLastError(TraceSource::Injection, __FUNCTION__,
L"_VirtualFreeEx" );
                }
            }
            else
   TraceLastError(TraceSource::Injection, __FUNCTION__,
L"_VirtualProtectEx" );
          }
              else
                Trace( TraceSource::Injection,
TraceLevel::Error, L"%S - FAILURE: Tokenizing Failed.",
__FUNCTION__ );
        }
          __except( ExceptionFilter(
GetExceptionInformation( ), TRUE, TRUE ) )
          {
              result = FALSE;
          }
      }
        __finally
      {
          free(pBuffer);
        }
    }
    else
       TraceLastError( TraceSource::Injection, __FUNCTION__,
L"malloc" );
    return result;
}
```

In another aspect, the following is an example pseudo-code implementation working with immediate:

```
template<class TokenType>
static BOOL ReplaceImmediateToken( PVOID pBuffer, DWORD codeLength,
TokenType token, TokenType newValue )
{
  _ASSERT(pBuffer!=NULL);
  if( pBuffer == NULL )
     return FALSE;
  BOOL result = FALSE;
  OpenSpan::CInstruction ci;
  for( DWORD_PTR pCode = (DWORD_PTR)pBuffer;
     pCode<((DWORD_PTR)pBuffer + codeLength);
     pCode = (DWORD_PTR)ci.NextInstruction( ) )
  {
    if( pCode == NULL )
       break;
    if( ci.Initialize( NULL, (PVOID)pCode, NULL, TRUE ) == TRUE )
    {
      if( ci.ImmediateSize( ) == sizeof(TokenType) )
      {
        if( (TokenType)ci.ImmediateValue( ) == token )
        {
          PVOID pImmediate = ci.pImmediate( );
          *((TokenType *)pImmediate) = newValue;
          result = TRUE;
        }
      }
    }
    else
       return FALSE;
  }
  return result;
}
```

It should be appreciated that any operand type or width can be replaced with similar logic. It should also be appreciated that if an instruction uses immediate value(s), such as add AX, 0xF00F, the immediate value is the last part of the instruction. Similarly to addressing displacements, immediates can be either a byte or the target machine size, e.g., a DWORD (32 bits) for 32-bit systems.

In code injection scenarios that include relative offsets, logic for code injection can account for location in an instruction stream in order to change the passed in literal value to a relative offset from the location in the code buffer. Exemplary logic accounting for such location can be the following:

```
if( (DWORD)ci.ImmediateValue( ) == token )
{
  // offset of pImmediate in our code buffer
    PVOID pImmediate = ci.pImmediate( );
  // offset of where pImmediate will be in remote buffer
    DWORD_PTR immediateOffset = (DWORD_PTR)pImmediate - (DWORD_PTR)pBuffer;
  // Since this is a relative offset, we need to take into account the remote address
  // hence this match above
    DWORD_PTR remoteImmediate = (DWORD_PTR)pBase + immediateOffset;
  // So we are changing the local buffer (that will be copied to a target)
  // with an offset based on remote buffer
  // If doing it locally, just have pBuffer = pRemoteBuffer
    DWORD offset = (DWORD)((DWORD_PTR)address - (DWORD_PTR)remoteImmediate - (DWORD_PTR)size of(DWORD) );
    *((DWORD *)pImmediate) = offset;
```

An exemplary pLdrpLoadDll32Hook as described herein is the following.

```
;NTSTATUS NTAPI LdrpLoadDllCallback(DWORD fileIsolationRedirectionFlag,
;                                                          PWCHAR path,
;                                                          DWORD *flags,
;                                                          PUNICODE_STRING moduleFileName,
;                                                          HMODULE *phModule,
;                                                          DWORD recursionFlag )
_LdrpLoadDll32Hook@24 PROC
    recursion             equ [ebp + 1ch]
    phModule              equ [ebp + 18h]
    pModuleName           equ [ebp + 14h]
    pFlags                equ [ebp + 10h]
    pPath                 equ [ebp + 0ch]
    flag                  equ [ebp + 08h]
    RA                    equ [ebp + 04h]
    SavedEBP              equ [ebp + 0h]
    baseAddress           equ [ebp - 04h]
    bytesToProtect        equ [ebp - 08h]
    oldProtection         equ [ebp - 0ch]
    hModule               equ [ebp - 10h]
    pFunction             equ [ebp - 14h]
    LdrpLoadDll32SpotTokenDword          equ  011111111h
    CopiedData1Token                 equ  022222222h
    CopiedData2Token                 equ  033333333h
    DllUnicodeAddress32TokenDword              equ 044444444h
    SearchPathAddress32TokenDword              equ 055555555h
    LdrLoadDll32SpotTokenDword           equ  066666666h
    FunctionNameAnsiAddress32TokenDword        equ 077777777h
    LdrGetProcedureAddress32SpotTokenDword     equ  088888888h
    InjectionDataAddress32TokenDword           equ  099999999h
    push    ebp
    mov     ebp, esp
    sub     esp, 14h
    ; Restore patch to original code
    mov     edx, LdrpLoadDll32SpotTokenDword
    mov     eax, DWORD PTR [edx]
```

```
        mov     (OriginalCode PTR [eax]) .Data1, CopiedData1Token
        mov     (OriginalCode PTR [eax]) .Data2, CopiedData2Token
        ; Call LdrpLoadDll on behalf of caller
        ;       push    1
        ;       push    dword ptr [ebp-248h]
        ;       push    eax
        ;       push    dword ptr [ebp-250h]
        ;       push    dword ptr [ebp-24Ch]
        ;       push    dword ptr [ebp-240h]
        ;       call    ntdll!LdrpLoadDll (7c916529)
        push    recursion
        push    phModule
        push    pModuleName
        push    pFlags
        push    pPath
        push    flag
        mov     edx,    LdrpLoadDll32SpotTokenDword
        mov     eax,    DWORD PTR [edx]
        call    eax
        test    eax,    eax
        jnz     EXIT
        ; now we can load our dll
        lea     eax,    hModule
        push    eax
        mov     eax,    DllUnicodeAddress32TokenDword
        push    eax
        push    0
        mov     eax,    SearchPathAddress32TokenDword          ;
address of search path
        push    eax
        mov     edx,    LdrLoadDll32SpotTokenDword
        mov     eax,    DWORD PTR [edx]
        call    eax
        test    eax,    eax
        jnz     EXIT
        ; now we can call the OpenSpanIntialize initialization
function
        ; NTSTATUS LdrGetProcedureAddress( hModule, PANSI_STRING
functionName, WORD ordinal, PVOID *pFunction )
        lea     eax,    pFunction
        push    eax
        push    0
        mov     eax,    FunctionNameAnsiAddress32TokenDword
        push    eax
        mov     eax,    dword ptr [hModule]
        push    eax
        mov     edx,    LdrGetProcedureAddress32SpotTokenDword
        mov     eax,    DWORD PTR [edx]
        call    eax
        test    eax,    eax
        jnz     EXIT
        mov     eax, InjectionDataAddress32TokenDword ; This will allow
programatic control of what type of injection
        push    eax
        mov     eax, dword ptr [pFunction]
        call    eax
        add     esp, 4          ; recover stack due to cdecl
EXIT:
        mov     esp, ebp        ; recover locals
        pop     ebp
        retn    18h             ; pop 6 arguments (24 bytes)
_LdrpLoadDll32Hook@24 ENDP
```

Various advantages with respect to conventional code injection and code interception techniques emerge from the features and aspects described herein. As an example, commonly observed obstacles to implementation of code injection are overcome, thus permitting sophisticated code injection or function hooking. As another example, code with minimal requirements related to code injection (such as viruses or malware for research and testing) can benefit from one or more aspects of the disclosure.

In various embodiments, the systems and methods of the subject disclosure for code injection and code interception can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the systems, devices, apparatuses, protocols, processes, and methods have been described in connection with example embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as exemplary only, with a true scope and spirit of the subject disclosure being indicated by the following claims.

What is claimed is:

1. A method, comprising:
    creating, by a computing device, a virtual process that is an executable, but non-executing image of a target process, wherein the target process is incompatible with a software platform of the computing device and the target process is loaded into a memory using a non-operating system loader, wherein the virtual process is created by determining an executable file format of the target process using a common interface and a class that implements details of an executable file format of the target process and loading a portable executable file of the target process having the determined executable file format into a private data space by analyzing a memory image of a process that an instance of the target process has previously been loaded into and working backwards from the memory image using an inverse of a specification of the executable file format to determine what an original executable file of the target process contained in order to build a private memory image including the virtual process using the determined file format;
    analyzing, by the computing device, the virtual process to find code compatible with the software platform; and
    injecting, by the computing device, a first portion of code compatible with the software platform into the target process to allow the target process to run based at least on an outcome of the analyzing action.

2. The method of claim 1, wherein the loader creates the virtual process by:
    processing a memory image of the target process; and
    producing a virtual image of the target process in a local process by copying headers and data structures from the target process to the virtual image.

3. The method of claim 2, wherein the headers and data structures are copied as needed to get current values.

4. The method of claim 2, wherein the building the private memory image comprises:
    translating from file offsets to memory addresses; and
    translating addresses from process memory managed by the operating system to the private memory image of the virtual process.

5. The method of claim 1, wherein the target process is incompatible with the software platform because the target process is one of and x32 or an x64 process and the software platform is the other of an x32 process or an x64 process.

6. The method of claim 5, wherein the virtual process is managed by a dynamic linked library of relocatable and tokenized code buffers adapted to manage the virtual process regardless of executable file format or target platform.

7. The method of claim 1, wherein the target process and the another process utilize different executable file formats.

8. An apparatus, comprising:
    a memory having computer-executable instructions encoded thereon; and
    a processor functionally coupled to the memory and configured by the computer-executable instructions,
    to create a virtual process that is an executable, but non-executing image of a target process, wherein the target process is incompatible with a software platform of in the computing device and the target process is loaded into a memory using a non-operating system loader, wherein the virtual process is created by determining an executable file format of the target process using a common interface and a class that implements details of an executable file format of the target process and loading a portable executable file of the target process having the determined executable file format into a private data space by analyzing a memory image of a process that an instance of the target process has previously been loaded into and working backwards from the memory image using an inverse of a specification of the executable file format to determine what an original executable file of the target process contained in order to build a private memory image including the virtual process using the determined file format;
    analyzing, by the computing device, the virtual process to find code compatible with the software platform; and
    injecting, by the computing device, a first portion of code compatible with the software platform into the target process to allow the target process to run based at least on an outcome of the analyzing action.

9. The apparatus of claim 8, the processor being further configured to cause the loader to create the virtual process by:
    processing a memory image of the target process; and
    producing a virtual image of the target process in a local process by copying headers and data structures from the target process to the virtual image.

10. The apparatus of claim 9, wherein the headers and data structures are copied as needed to get current values.

11. The apparatus of claim 10, wherein the building the private memory image comprises:
    translating from file offsets to memory addresses; and
    translating addresses from process memory managed by the operating system to the private memory image of the virtual process.

12. The apparatus of claim 8, wherein the target process is incompatible with the software platform because the target process is one of and x32 or an x64 process and the software platform is the other of an x32 process or an x64 process.

13. The apparatus of claim 12, wherein the virtual process is managed by a dynamic linked library of relocatable and tokenized code buffers adapted to manage the virtual process regardless of executable file format or target platform.

14. The apparatus of claim 8, wherein the target process and the another process utilize different executable file formats.

* * * * *